United States Patent
Kawanishi et al.

(10) Patent No.: US 9,402,021 B2
(45) Date of Patent: *Jul. 26, 2016

(54) IMAGE-PICKUP APPARATUS, LENS UNIT, CONTROL METHOD OF THE IMAGE-PICKUP APPARATUS, CONTROL METHOD OF THE LENS UNIT, AND IMAGE-PICKUP SYSTEM

(71) Applicant: CANON KABUSHIKI KAISHA, Tokyo (JP)

(72) Inventors: Atsuya Kawanishi, Kawasaki (JP); Hideyasu Hongu, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/546,204

(22) Filed: Nov. 18, 2014

(65) Prior Publication Data

US 2015/0070567 A1 Mar. 12, 2015

Related U.S. Application Data

(62) Division of application No. 13/905,705, filed on May 30, 2013, now Pat. No. 8,917,983.

(30) Foreign Application Priority Data

Jun. 5, 2012 (JP) .................... 2012-127875
Jun. 5, 2012 (JP) .................... 2012-127886

(51) Int. Cl.
| | |
|---|---|
| H04N 5/232 | (2006.01) |
| G02B 7/04 | (2006.01) |
| G02B 7/10 | (2006.01) |
| G03B 17/14 | (2006.01) |
| H04N 5/08 | (2006.01) |
| G03B 13/36 | (2006.01) |

(52) U.S. Cl.
CPC .............. *H04N 5/23212* (2013.01); *G02B 7/04* (2013.01); *G02B 7/102* (2013.01); *G03B 17/14* (2013.01); *H04N 5/08* (2013.01); *H04N 5/23209* (2013.01); *G03B 13/36* (2013.01)

(58) Field of Classification Search
USPC ............................................ 396/93
See application file for complete search history.

(56) References Cited

U.S. PATENT DOCUMENTS

| | | | |
|---|---|---|---|
| 2009/0245778 A1 | 10/2009 | Shibuno et al. | |
| 2012/0162453 A1* | 6/2012 | Murayama | H04N 13/021 348/208.4 |
| 2013/0182175 A1* | 7/2013 | Yasuda | G03B 3/10 348/360 |
| 2014/0218564 A1* | 8/2014 | Tomosada | G02B 27/646 348/231.6 |

FOREIGN PATENT DOCUMENTS

CN 101295122 A 10/2008

OTHER PUBLICATIONS

Jan. 4, 2016 Chinese Office Action, which is enclosed with an English Translation, that issued in Chinese Patent Application No. 201310221592.5.

* cited by examiner

*Primary Examiner* — Clayton E LaBelle
*Assistant Examiner* — Linda B Smith
(74) *Attorney, Agent, or Firm* — Cowan, Liebowitz & Latman, P.C.

(57) ABSTRACT

An image-pickup apparatus to which a lens unit that includes an image-pickup optical system including a focus lens is attachable includes an image sensor configured to photoelectrically convert an object image formed via the lens unit that has been attached, and to generate an image signal, and a controller configured to generate information on driving of the focus lens in the lens unit based upon the image signal and to provide focus control, the controller communicating data with the lens unit, wherein the controller transmits information on a driving target position of the focus lens to the lens unit in a first control, and transmits information on a driving direction and driving speed of the focus lens to the lens unit in a second control different from the first control.

27 Claims, 14 Drawing Sheets

IMAGE-PICKUP APPARATUS, LENS UNIT, CONTROL METHOD OF THE IMAGE-PICKUP APPARATUS, CONTROL METHOD OF THE LENS UNIT, AND IMAGE-PICKUP SYSTEM

CROSS-REFERENCE TO RELATED APPLICATIONS

This application is a divisional of application Ser. No. 13/905,705, filed May 30, 2013, the entire disclosure of which is hereby incorporated by reference.

BACKGROUND OF THE INVENTION

1. Field of the Invention

The present invention relates to a lens interchangeable image-pickup apparatus, such as a video camera.

2. Description of the Related Art

In a lens interchangeable type camera system, an image-pickup apparatus, such as a video camera, generates a focus signal, and an interchangeable lens attachable to the image-pickup apparatus drives a focus lens. It is necessary to properly manage generating timing of the focus signal and driving timing of the focus lens. For example, Japanese Patent Laid-Open No. ("JP") 2009-258718 discloses a method for wobbling in the contrast AF ("TVAF") control in the lens interchangeable type camera system in which a camera controller sets the driving timing of the focus lens and transmits the set driving timing to a lens controller.

In a proposed AF system for a lens interchangeable type camera in which a focus sensitivity of an attached lens is unknown, a camera microcomputer provides the AF control and transmits a driving command of a focus lens to a lens microcomputer. For wobbling and mountain-climbing of the TVAF control in this AF system, the lens microcomputer needs to correctly recognize the current AF operation mode in the camera. The lens microcomputer also needs to correctly control driving of the focus lens in accordance with the AF operation mode of the camera so as to prevent the malfunction.

Information that the lens microcomputer needs for the mountain-climbing may be different from that for the wobbling. Therefore, when the method disclosed in JP 2009-258718 for the wobbling is applied to the mountain-climbing, the lens microcomputer may not properly control driving of the focus lens in the mountain-climbing. As a solution for this problem, it is conceivable to change a communication mode in the mountain-climbing and to transmit necessary information from the camera microcomputer to the lens microcomputer. Nevertheless, the system becomes complex, because if the operation is frequently switched between the wobbling and the mountain-climbing, the communication mode is also frequently switched.

SUMMARY OF THE INVENTION

The present invention provides an image-pickup apparatus, a lens unit, and an image-pickup system, configured to provide proper focus control in accordance with an AF operation mode for each of a variety of interchangeable lenses attached to the image-pickup apparatus.

An image-pickup apparatus according to the present invention to which a lens unit that includes an image-pickup optical system including a focus lens is attachable includes an image sensor configured to photoelectrically convert an object image formed via the lens unit that has been attached, and to generate an image signal, and a controller configured to generate information on driving of the focus lens in the lens unit based upon the image signal and to provide focus control, the controller communicating data with the lens unit, wherein the controller transmits information on a driving target position of the focus lens to the lens unit in a first control, and transmits information on a driving direction and driving speed of the focus lens to the lens unit in a second control different from the first control.

Further features of the present invention will become apparent from the following description of exemplary embodiments with reference to the attached drawings.

DESCRIPTION OF THE EMBODIMENTS

A variety of embodiments of the present invention will be described in detail with reference to the accompanying drawings.

First Embodiment

Figure 1:
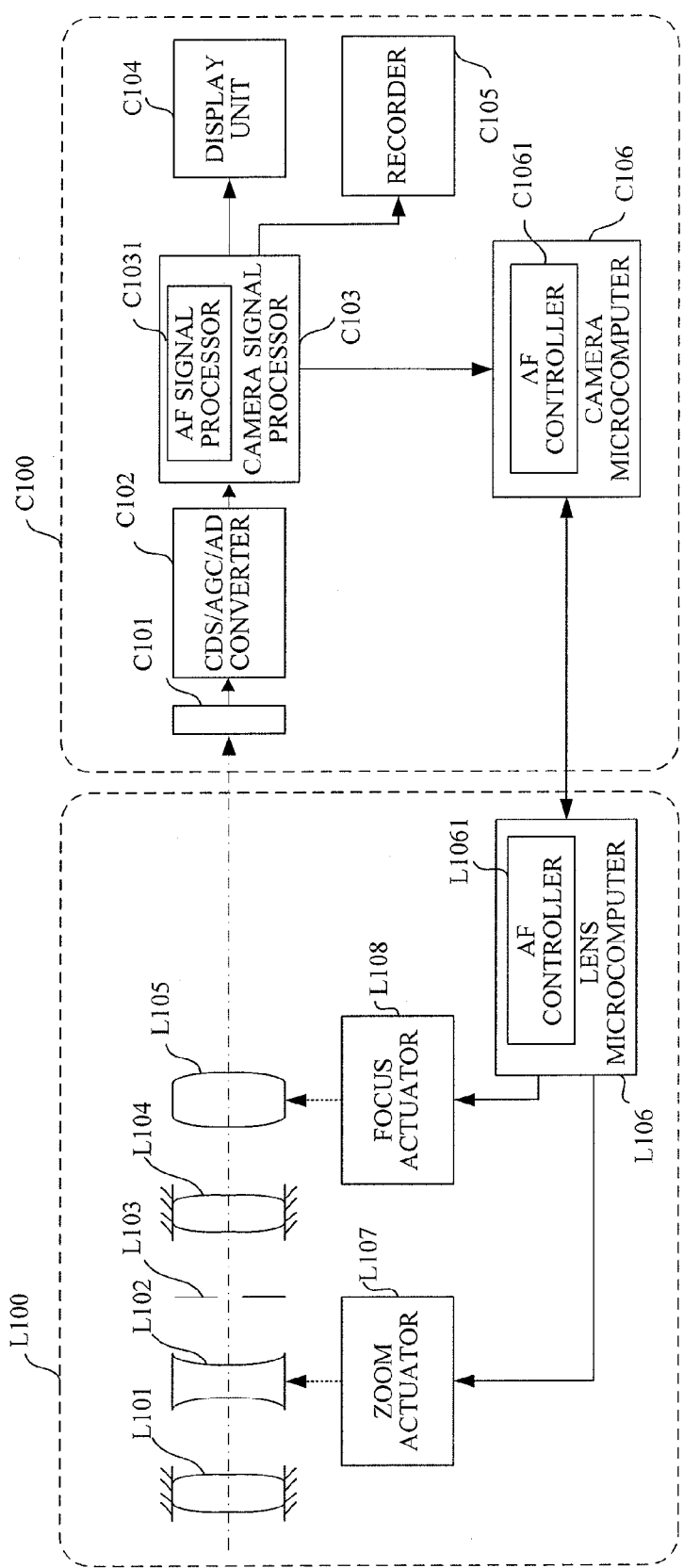
FIG. 1 is a block diagram of a configuration of a lens interchangeable type camera system according to a first embodiment of the present invention.

FIG. 1 illustrates a configuration of the lens interchangeable type camera system (image-pickup system) according to the first embodiment. In FIG. 1, a lens unit (interchangeable lens) L100 is attached to and detached from a camera body (or video camera body, image-pickup apparatus) C100, and a camera body C100 can be mounted with the lens unit L100.

Light from an object forms an object image on an image sensor C101 in the camera body C100, which will be described later, through an image-pickup optical system L101-L105 in the lens unit L100. In the lens unit L100 of FIG. 1, a first fixed lens L101 and a second fixed lens L104 are lenses fixed in the lens unit L100. A magnification-varying lens L102 is a lens configured to move in an optical axis direction of the lens unit L100 for a magnification variation. A diaphragm L103 adjusts the light intensity incident upon the image sensor C101. A focus lens L105 is a lens that serves to correct an image plane variation according to the magnification variation and to provide focusing. As illustrated in FIG. 1, the image-pickup optical system of this embodiment includes, in order from the object side, the first fixed lens L101, the magnification-varying lens L102, the diaphragm (stop) L103, the second fixed lens L104, and the focus lens L105. The configuration of the image-pickup optical system illustrated in FIG. 1 according to this embodiment is merely illustrative, and the present invention is not limited to this embodiment. In FIG. 1, each lens unit include one lens but may actually include one or more lenses.

In the camera body C100 illustrated in FIG. 1, the image sensor C101 is a photoelectric conversion element, such as a CCD sensor and a CMOS sensor, configured to photoelectrically convert an object image and to output an analogue signal. The image sensor C101 may be provided one each for each of three primary colors of red (R), green (G), and blue (B). The CDS/AGC/AD converter C102 samples the output of the image sensor C101, gain-controls and digitally converts the sampled output. A camera signal processor C103 performs various image processing for an output signal from the CDS/AGC/AD converter C102, and generates the image.

The camera signal processor C103 includes an AF signal processor C1031. The AF signal processor C1031 generates a focus signal by extracting a high-frequency component or a brightness difference component based upon the output signal from pixels of a focus detecting area in the output signal (image signal) from all pixels derived from the image sensor C101 and the CDS/AGC/AD converter C102. The focus signal is referred to as a contrast evaluation value signal, and represents the sharpness (contrast state) of an image generated based upon the output signal from the image sensor C101. The sharpness changes according to a focus state of the image-pickup optical system and consequently, the focus signal represents the focus state of the image-pickup optical system.

A display unit C104 displays an image from the camera signal processor C103, and a recorder C105 records an image from the camera signal processor C103 in a recording medium, such as a magnetic tape, an optical disk, and a semiconductor memory. A camera microcomputer (image-pickup apparatus controller) C106 controls the entire operation of the camera body C100. The camera microcomputer C106 controls a focus actuator L108 in the lens unit L100, which will be described later, based upon the output from the camera signal processor C103, and moves the focus lens L105 in the optical axis direction. In this embodiment, (the camera microcomputer C106 of) the camera body provides the AF control. This operation is performed mainly by the camera AF controller C1061 in the camera microcomputer C106. The camera AF controller C1061 generates information on driving of the focus lens based upon the focus signal output from the camera signal processor C103. A detailed operation of the camera AF controller C1061 will be described later. The camera microcomputer C106 serves as a communication unit configured to communicate with the lens microcomputer L106, which will be described later.

In the lens unit L100 in FIG. 1, a lens microcomputer L106 serves as a communication unit configured to transmit information to and receive information from (or communicate information with) the camera microcomputer C106. The lens microcomputer L106 includes a lens AF controller L1061. The lens AF controller L1061 controls focusing in accordance with a target position of the focus lens L105 determined by the camera AF controller C1061. The lens AF controller L1061 provides a zoom tracking control configured to move the focus lens L105 based upon zoom tracking data (a zoom tracking cam) stored in the lens microcomputer L106 in the magnification variation. The zoom tracking data is stored data on a relationship between the position of the focus lens L105 and the magnification-varying lens L102 for each of a plurality of focal lengths, and represents a locus of the focus lens L105 so as to maintain the in-focus state. This configuration prevents an image plane fluctuation (blur) associated with the magnification variation.

The zoom actuator L107 is a zoom driving source configured to move a magnification-varying lens L102. The focus actuator L108 is a focus driving source configured to move the focus lens L105. Each of the zoom actuator L107 and the focus actuator L108 includes an actuator, such as a stepping motor, a DC motor, a vibration type motor, and a voice coil motor.

Figure 2:
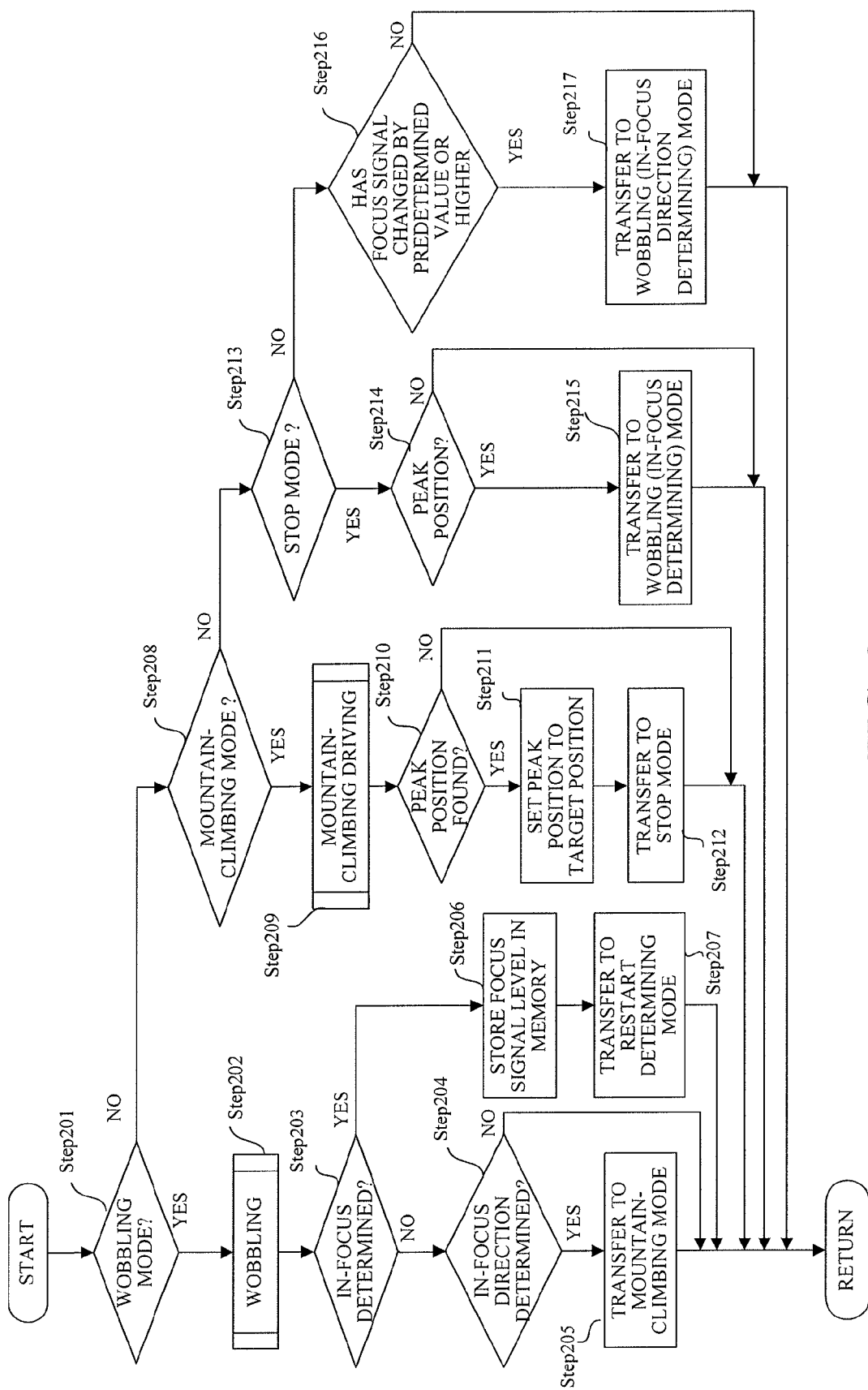
FIG. 2 is a flowchart of a TVAF control according to the first embodiment.
Figure 3A:
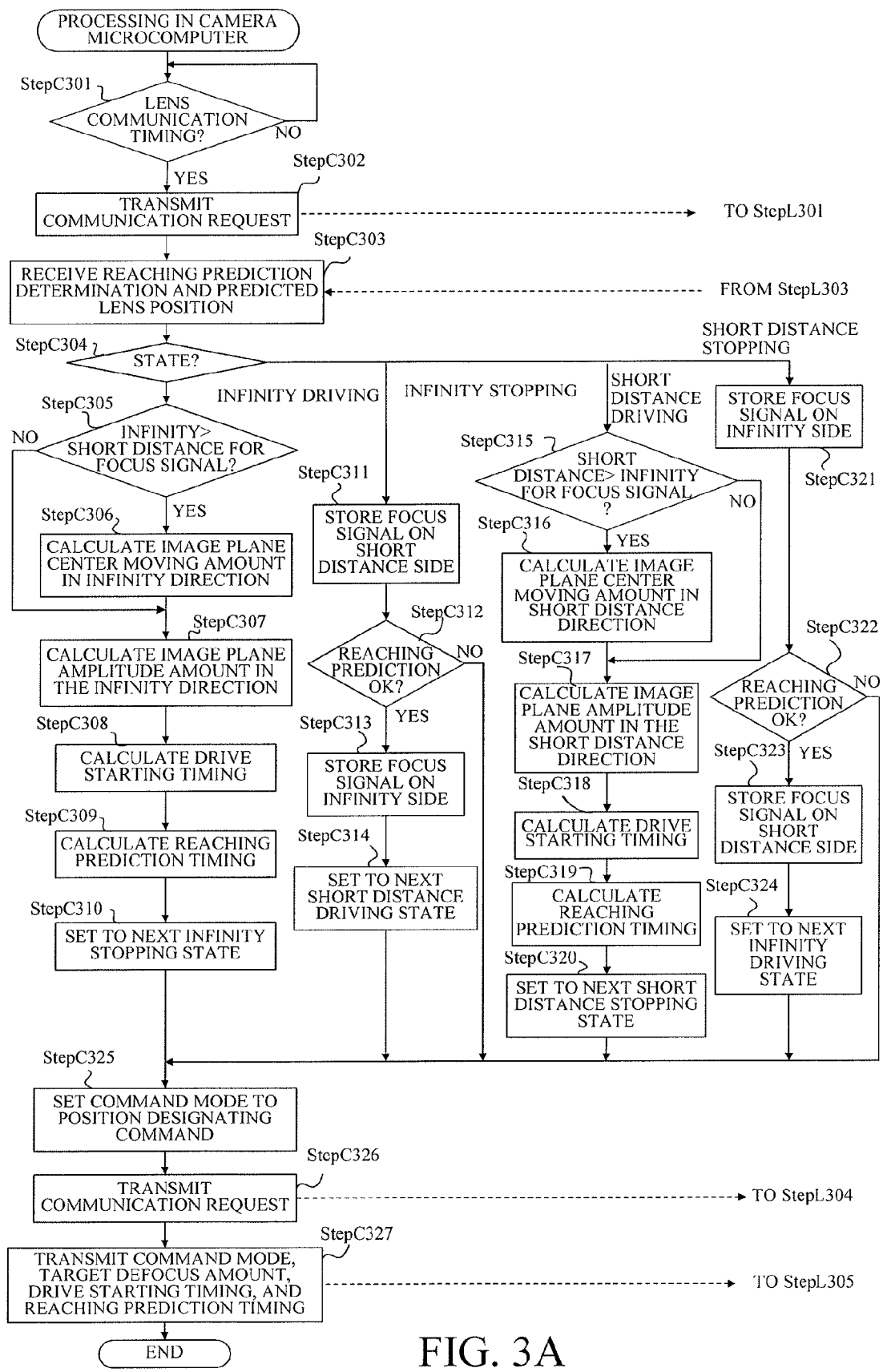
FIGS. 3A and 3B are flowcharts of wobbling (drive) according to the first embodiment.
Figure 3B:
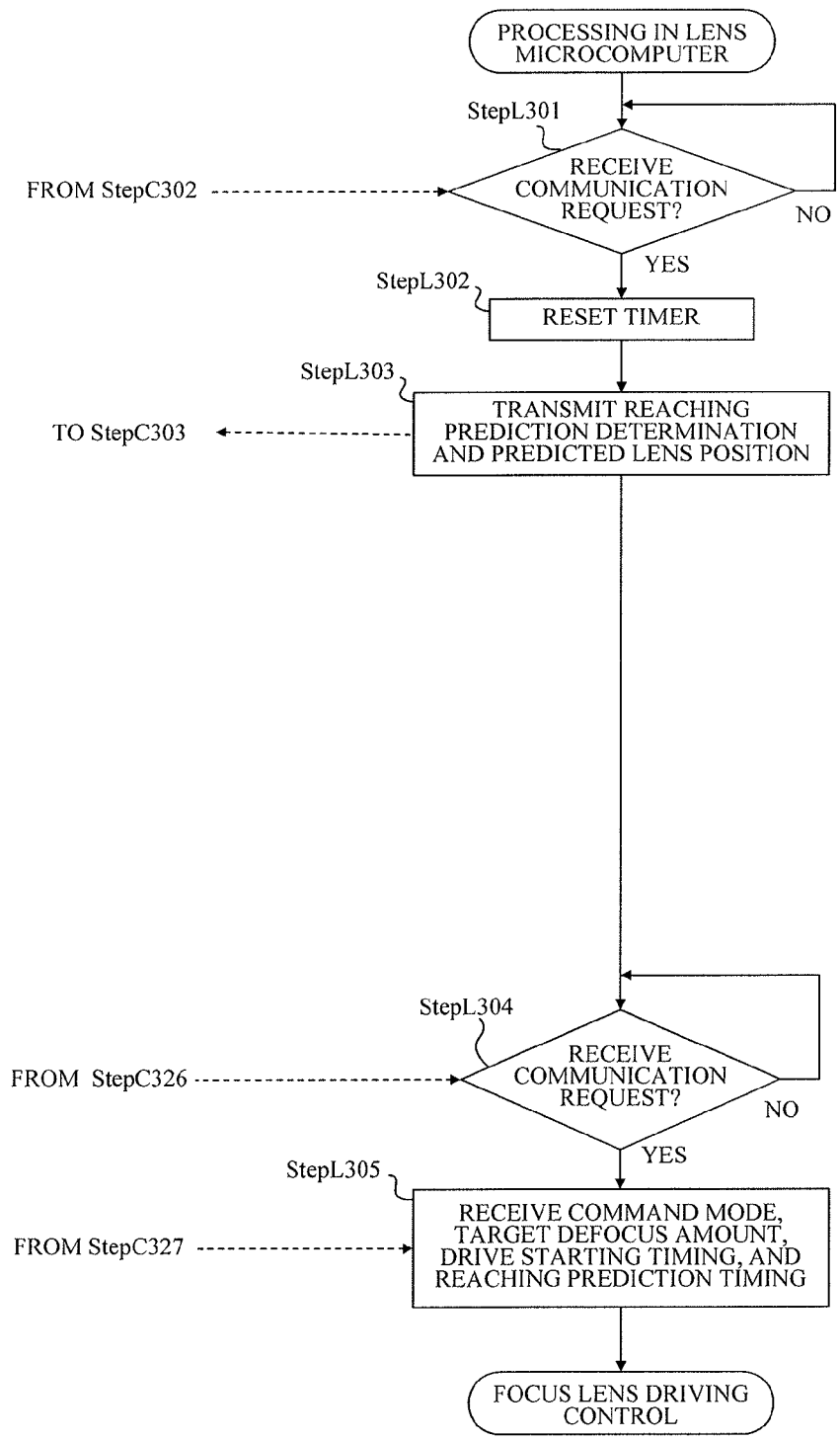
Figure 4:
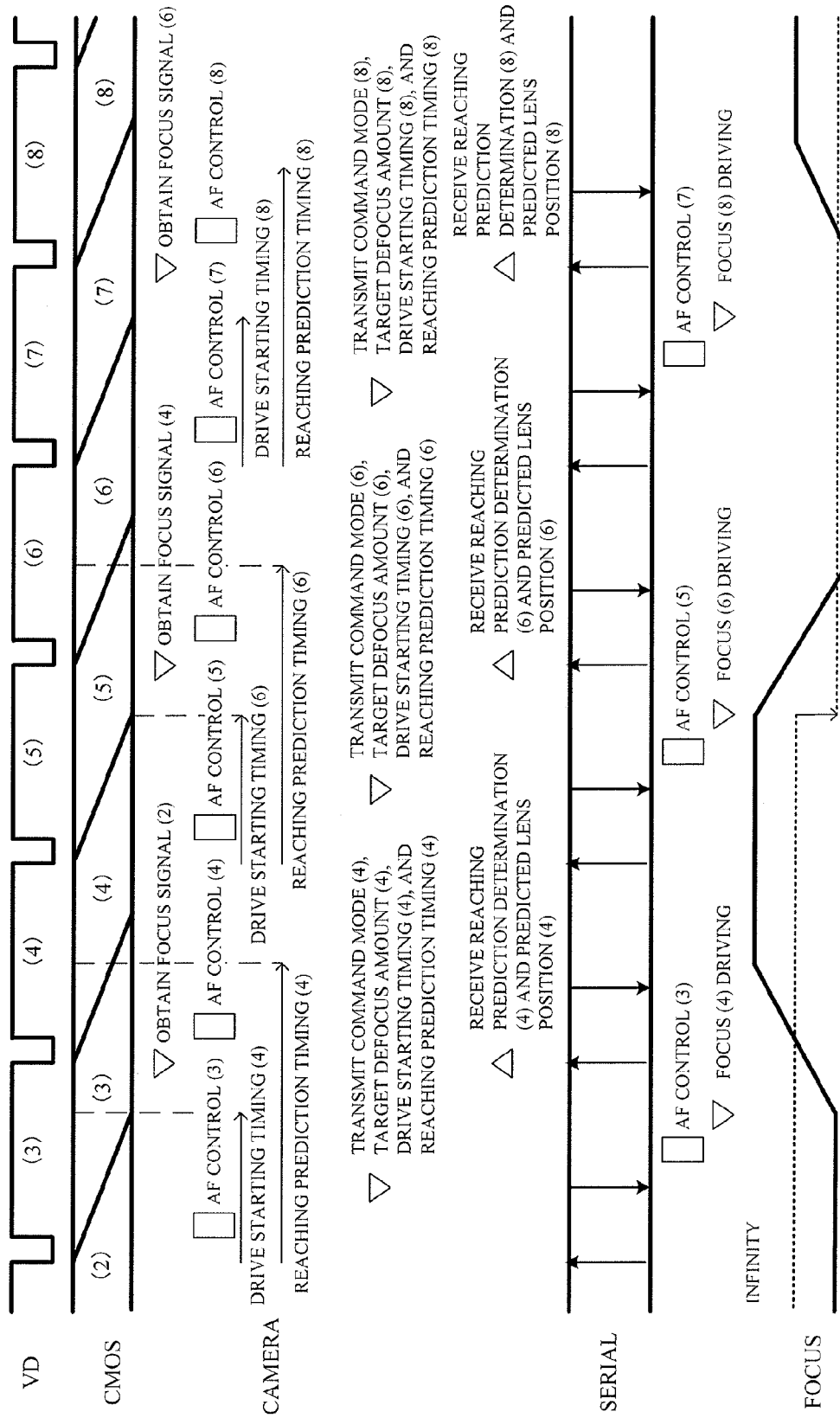
FIG. 4 is a timing chart of the wobbling according to the first embodiment.

Referring now to FIGS. 2 to 4, a description will be given of an overview of the focus control (TVAF control) performed by the lens microcomputer L106 and the camera microcomputer C106.

FIG. 2 is a flowchart of an overview of the TVAF control in the live-view display mode or a motion image-pickup mode. This procedure is mainly executed by the camera AF controller C1061 in the camera microcomputer C106 in accordance with a computer program. This is true of other embodiments.

The camera microcomputer C106 (camera AF controller C1061) controls driving and a position of the focus lens L105 through communications with the lens microcomputer L106 (lens AF controller L1061).

In FIG. 2, in Step 201, the camera microcomputer C106 determines whether the current TVAF mode is a wobbling mode. If so the flow moves to the Step 202, and if not the flow moves to Step 208.

In Step 202, the camera microcomputer C106 performs a wobbling operation so as to wobble the focus lens L105 with the predetermined amplitude, and determines whether it is in-focused and if not determines which direction an in-focus point exists. A detailed operation will be described with reference to FIGS. 3 and 4.

In Step 203, the camera microcomputer C106 determines whether the focus lens L105 reciprocates in the same area a predetermined number of times based upon the positional history of the focus lens L105 as a result of the wobbling operation in the Step 202. If so the in-focus is determined and the flow moves to Step 206, and if not the in-focus has not yet been determined and the flow moves to Step 204.

In the Step 204, the camera microcomputer C106 determines whether it has determined that the in-focus point exists in the same direction a predetermined number of times based upon the positional history of the focus lens L105 as a result of the wobbling operation in the Step 202. If so, the flow moves to Step 205 for the climbing (drive) mode because the in-focus direction has been determined. If not, the flow returns to the Step 201 because the in-focus direction has not yet been determined.

In the Step 206, the camera microcomputer C106 stores a focus signal level at the in-focus position in a memory (not illustrated), and the flow moves to Step 207 for a restart determining mode. The restart determining mode is a mode configured to determine whether wobbling is again necessary to determine the in-focus direction. This will be described in Steps 216 and 217, which will be described later.

In the Step 208, the camera microcomputer C106 determines whether the current TVAF mode is a mountain-climbing mode. If so the flow moves to Step 209, and if not the flow moves to Step 213.

In the Step 209, the camera microcomputer C106 provides the mountain-climbing configured to drive the focus lens L105 at a predetermined speed in which a value of the focus signal increases. A detailed description will be described with reference to FIGS. 5 and 6.

In Step 210, the camera microcomputer C106 determines whether the position of the focus lens L105 (referred to as a "peak position" hereinafter) which provides a maximum value (a value representing the in-focus state of the image-pickup optical system) is detected by the mountain-climbing in the Step 209. When the peak position is detected, the flow moves to Step 211, and if not the flow returns to the Step 201 so as to continue the mountain-climbing mode. When it is determined that the peak position is detected in the Step 210, the focus lens L105 is moved to the peak position (Step 214) and the in-focus determining mode follows (Step 215) as described later.

In the Step 211, the camera microcomputer C106 sets the peak position to the target position of the focus lens L105. Then, the flow moves to Step 212 for the stopping mode.

In the Step 213, the camera microcomputer C106 determines whether the current TVAF mode is the stopping mode, and if so the flow moves to Step 214, and if not the flow moves to Step 216.

In the Step 214, the camera microcomputer C106 determines whether the focus lens L105 has returned to the peak position. If so, the flow moves to the Step 215 for the wobbling mode (in-focus determination), and if not the flow returns to the Step 201 so as to continue the stopping mode.

In the Step 216, the camera microcomputer C106 compares the level of the current focus signal with the level of the focus signal held in the Step 206, and determines whether the variation amount is larger than the predetermined amount. When the variation amount is larger than the predetermined amount, the flow moves to Step 217 for the wobbling (direction determining) mode so as to determine the in-focus direction, if not the flow returns to the Step 201 so as to continue the restart determining mode.

The above processing described in the flowchart in FIG. 2 is repeated in the live-view mode or the motion image-pickup mode.

Referring now to FIGS. 3 and 4, a description will be given of the flow of the control of the camera microcomputer C106 and the lens microcomputer L106 in the wobbling of the Step 202.

In this embodiment, the camera microcomputer C106 sends the drive starting timing of focus lens L105 (also referred to as "driving timing" hereafter) and reaching prediction timing to the lens microcomputer L106. The reaching prediction timing is timing at which the lens microcomputer L106 predicts whether the focus lens L105 can reach the target position within a predetermined time period. The lens microcomputer L106 sends back to the camera microcomputer C106 a prediction result made at the reaching prediction timing of whether the focus lens L105 can reach the target position within the predetermined time period. Thereby, the focus control can be made by managing both control timings.

In FIG. 3A, in Step C301, the camera microcomputer C106 determines whether the current timing for the vertical synchronizing signal of the image accords with the predetermined timing of the lens communication with the lens microcomputer L106. If so, the flow moves to Step C302, and if not the flow returns to the Step C301 for standing by. The timing of the lens communication for the vertical synchronizing signal can be arbitrarily set based upon the image signal accumulation timing of the image sensor C101 but a delay time period to the vertical synchronizing signal needs to be constant.

In this embodiment, the camera microcomputer C106 and the lens microcomputer L106 perform a fixed-length packet communication twice in one vertical synchronizing period. In the two communications, a communication performed in Steps C303 and L303 will be referred to as a first communi-cation, and a communication performed at Step C327 and L305 will be referred to as a second communication, as described later.

In the Step C302, the camera microcomputer C106 transmits a communication request to the lens microcomputer L106 so as to start the lens communication.

In Step L301, the lens microcomputer L106 determines whether it has received the communication request, which has been transmitted from the camera microcomputer C106 in the Step C302. If so the flow moves to Step L302, and if not the flow returns to the Step L301 for standing by.

In the Step L302, the lens microcomputer L106 resets the internal timer using the start of the first lens communication as a trigger, and measures a delay time period from the start of the lens communication.

In Step L303, the lens microcomputer L106 transmits as a first communication a result of a reaching prediction determination and predicted lens position calculated in the last processing to the camera microcomputer C106. The content of the reaching prediction determination and predicted lens position will be described in detail later in Step L1104.

In the Step C303, the camera microcomputer C106 receives the result of the reaching prediction determination and the predicted lens position, which have been transmitted from the lens microcomputer L106 in the Step L303. If the current VD is (4) in the example illustrated in FIG. 4, then this processing corresponds to the timing (4) of receiving the reaching prediction determination. etc.

In Step C304, the camera microcomputer C106 determines which of infinity driving, infinity stopping, short distance driving, and short distance stopping the current control state is. If the current control is the infinity driving, then the flow moves to Step C305. If the current control is the infinity stopping, then the flow moves to Step C311. If the current control is the short distance driving, then the flow moves to Step C315. If the current control is the short distance stopping, then the flow moves to Step C321.

In the Step C305, the camera microcomputer C106 compares the level of the focus signal on the infinity side stored in the previous step C321 with the level of the focus signal on the short distance side stored in the previous Step C311. If the former is larger, then the flow moves to the Step C306, and if not, then the flow moves to the Step C307. If the current VD is (7) in the example of FIG. 4, then the focus signal (4) is compared with the focus signal (2).

In the Step C306, the camera microcomputer C106 calculates, as a defocus amount on the image-pickup plane, an (image plane center) moving amount in the infinity direction of the center position that is the driving center of the focus lens L105. This defocus amount is set to a value within the depth of focus.

In the Step C307, the camera microcomputer C106 calculates, as a defocus amount on the image-pickup plane, a driving amount (image plane amplitude amount, vibration amplitude amount) in the infinity direction of the center position of the focus lens L105. Similar to the moving amount of the center position, this defocus amount is set to a value within the depth of focus.

In the Step C308, the camera microcomputer C106 calculates the drive starting timing used to actually start driving the focus lens L105 by a defocus amount (target defocus amount) calculated in the Steps C306 and C307. Herein, the drive staring timing is set based upon the accumulation completing timing of the image signal of the image sensor C101. If the current VD is (3) in the example of FIG. 4, the timing at which the accumulation (2) of the image sensor C101 is completed is the lens drive starting timing (4). This embodiment sets the timing at which the accumulation (2) of the image sensor C101 is completed to the lens drive starting timing (4). However, the lens drive starting timing (4) may be determined based upon the accumulation completion timing of the focus detecting area among the output signal from all the pixels of the image sensor C101. This embodiment defines this drive starting timing as a delay time period from the start of the first communication. However, the present invention is not limited to this embodiment, and a delay time period for the vertical synchronizing signal, a delay time period may be used.

In Step C309, the camera microcomputer C106 calculates the reaching prediction timing used to obtain the next target defocus amount if the focus lens L105 is driven at the drive starting timing calculated in the Step C308. A proper target defocus amount can be obtained if the focus lens L105 reaches the target position a predetermined permissible time period after the reaching prediction timing, and the reaching prediction timing is set based upon the charge accumulation start timing of the image signal of the image sensor C101. If the current VD is (3) in the example of FIG. 4, the timing the predetermined time period after the accumulation (4) of the image sensor C101 starts is the reaching prediction timing (4). This embodiment sets the reaching prediction timing (4) to the timing the predetermined time period after the accumulation (4) of the image sensor C101 starts. However, the reaching prediction timing (4) may be determined based upon the accumulation starting timing of the focus detecting area among the output signal from all the pixels of the image sensor C101. This embodiment defines this reaching prediction timing as a delay time period from the start of the first communication. However, the present invention is not limited to this embodiment, and the reaching prediction timing may be defined as a delay time period from a vertical synchronizing signal.

In the Step C310, the camera microcomputer C106 sets the next control state to the infinite stopping state.

When the current control state is the infinity stopping state in the Step C304, the camera microcomputer C106 obtains a focus signal and stores the signal as information obtained when the focus lens L105 stops at the short distance side in Step C311. In other words, the obtained signal is correlated with a focus signal generated from the image signal stored when the focus lens L105 is located at the position stored in the Step C323 at previous time. If the current VD is (4) in the example of FIG. 4, the obtainable focus signal is a signal generated from the image signal stored with VD(2) when the focus lens L105 stops on the short distance side.

In the Step C312, the flow of the camera microcomputer C106 moves to the Step C313 when the just previous result of the reaching prediction determination received in the Step C303 denotes reachable. If not, the flow moves to Step C325. If it is predicted as being unreachable the last time, the focus lens L105 is currently driving and the next obtainable focus signal is unlikely to obtain the proper defocus amount. It is thus necessary to delay a cycle of the TVAF control so as to avoid the malfunction.

In the Step C313, the camera microcomputer C106 recognizes that the focus lens L105 has reached the target position and stores the current position. The stored focus position is correlated with the focus signal obtained in the step C321, which will be described later.

In the step C314, the camera microcomputer C106 sets the next control state to the short distance driving state.

When the current control state is determined to be the short distance driving state in the Step C304, the camera microcomputer C106 in the Step C315 compares the level of the focus signal on the short distance side stored in the last step C311 with the level of the focus signal on the infinity side stored in the last Step C321. If the former is larger, then the flow moves to the Step C316, and if not, then the flow moves to the Step C317. If the current VD is (5) in the example of FIG. 4, then the focus signal (2) is compared with a focus signal (0) (not illustrated).

In the Step C316, the camera microcomputer C106 calculates, as a defocus amount on the image-pickup plane, an (image plane center) moving amount in the short distance direction of the center position that is the driving center of the focus lens L105. This defocus amount is set to a value within the depth of focus.

In the Step C317, the camera microcomputer C106 calculates, as a defocus amount on the image-pickup plane, a driving amount (image plane amplitude amount) in the short distance direction of the center position of the focus lens L105. Similar to the moving amount of the center position, this defocus amount is set to a value within the depth of focus.

In the Step C318, the camera microcomputer C106 calculates the drive starting timing used to actually start driving the focus lens L105. The drive starting timing is set based upon the accumulation completing timing of the image signal of the image sensor C101. If the current VD is (5) in the example of FIG. 4, the lens drive starting timing (6) is timing at which the accumulation (4) of the image sensor C101 is completed. This embodiment sets the lens drive starting timing (6) to timing at which the accumulation (4) of the image sensor C101 is completed. However, the lens drive starting timing (6) may be determined based upon the accumulation completing timing of the focus detecting area among the output signal of all pixels in the image sensor C101. This embodiment defines this drive starting timing as a delay time period from the start of the first communication. However, the present invention is not limited to this embodiment, and the drive starting timing may be defined as a delay time period from the vertical synchronizing signal, etc.

In Step C319, the camera microcomputer C106 calculates the reaching predicted timing used to obtain the next target defocus amount, when the focus lens L105 is driven at the drive starting timing calculated in the Step C318. The reaching prediction timing is set based upon the charge accumulation start timing of the image signal of the image sensor C101. If the current VD is (5) in the example of FIG. 4, the reaching prediction timing (6) is the predetermined time period after the accumulation (6) of the image sensor C101 starts. This embodiment sets the reaching prediction timing (6) to the predetermined time period after the accumulation (6) of the image sensor C101 starts. However, the reaching prediction timing (6) may be determined based upon the accumulation start timing of the focus detection area among the output signal in all pixels of the image sensor C101. According to this embodiment, this reaching prediction timing is defined by the delay time period from the start of the first communication. However, the present invention is not limited to this embodiment, and the reaching prediction timing may be defined as a delay time period from a vertical synchronizing signal.

In the Step C320, the camera microcomputer C106 sets the next control state to the short distance stopping state.

When the current control state is determined to be the short distance stopping state in the Step C304, the camera microcomputer C106 obtains a focus signal and stores the signal as information when the focus lens L105 stops at the infinity side in Step C321. In other words, the obtained signal is correlated with a focus signal generated from the image signal stored when the focus lens L105 is located at the position stored in the Step C313 last time. If the current VD is (6) in the example of FIG. 4, the obtainable focus signal is a signal generated from the image signal stored with VD(4) when the focus lens L105 stops on the infinity side.

In the Step C322, the camera microcomputer C106 moves to the Step C323 when the last result of the reaching prediction determination received in the Step C303 denotes reachable. If not, the flow moves to Step C325. If it is predicted as being unreachable last time, the focus lens L105 is currently driving and the next obtainable focus signal is unlikely to obtain the proper defocus amount. It is thus necessary to delay a cycle of the TVAF control so as to avoid the malfunction.

In the Step C323, the camera microcomputer C106 recognizes that the focus lens L105 has reached the target position and stores the current position. The stored focus position is correlated with the focus signal obtained in the next step C311.

In the step C324, the camera microcomputer C106 sets the next control state to the infinity driving state.

In Step C325, the current driving command is a command of directly or indirectly designating the target position, and thus command mode is set to a position designating command. In this embodiment, this command mode includes two types, i.e., a position designating command and a direction designating command, which will be described later, but may include a stopping command, an invalid command, etc. The camera microcomputer C106 can set one command mode among the position designating command, the direction designating command, the stopping command, and the invalid command. The position designating command is a first control that provides control by designating a driving target position of the focus lens, and the direction designating command is a second control that provides control by designating the driving direction of the focus lens.

In the Step C326, the camera microcomputer C106 again transmits the communication request to the lens microcomputer L106 and starts the lens communication.

In the Step L304, the lens microcomputer L106 determines whether the lens microcomputer L106 has received the communication request, which has been transmitted from the camera microcomputer C106 in the step C326. If so the flow moves to the Step L305, and if not the flow returns to the Step L304 for standing by.

In the Step C327, when the lens communication starts, the camera microcomputer C106 transmits information on driving of the focus lens L105 as the second communication to the lens microcomputer L106. The information on driving of the focus lens L105, as used herein, contains a command mode set in the Step C325. It also contains the target defocus amount, such as the image plane amplitude amount and the image plane center moving amount calculated in the Steps C306, C307, C316, and C317. It also contains drive starting timing calculated in the Step C308 or C318, and the reaching prediction timing calculated in the Step C309 or C319 (information on driving time of the focus lens). If the current VD is (5) in the example of FIG. 4, this processing corresponds to transmission timing of the command mode (6), the target defocus amount (6), etc. In the above wobbling, the driving speed, which will be described later, is set by the lens microcomputer L106, and an arbitrary numerical value is set to a data area used to set driving speed data (first data area). In other words, data set to the data area of the driving speed (the driving speed (6)) is not used for the lens unit. The arbitrary numerical value is set to the data area of the driving speed, although it is not used by the lens unit, because the camera microcomputer C106 and the lens microcomputer L106 provide a fixed-length packet communication.

In the Step L305, the lens microcomputer L106 receives information on the driving of the focus lens L105, such as the command mode and the target defocus amount, which has been transmitted from the camera microcomputer C106 in the Step C327. Thereafter, the lens microcomputer L106 provides driving control over the focus lens based upon the received information, as described later.

After the wobbling processing, the camera microcomputer C106 determines whether the focus lens L105 has reciprocated in the same area a predetermined number of times (NB). When determining that the focus lens L105 has reciprocated in the same area the predetermined number of times (NB), the camera microcomputer C106 calculates an in-focus position based upon the past lens position information and determines the in-focus. Then, the flow moves to the restart determining mode because the in-focus has been determined in the Step 203 in FIG. 2.

When determining that the focus lens L105 has not yet reciprocated in the same area the predetermined number of times (NB), the camera microcomputer C106 determines whether the same in-focus direction has been detected a predetermined number of times (NB). If the same in-focus direction is detected the predetermined number of times (NB), the camera microcomputer C106 determines the in-focus direction. In this case, the Step 204 moves to the Step 205 in FIG. 2, the in-focus direction is determined, and the flow moves to the mountain-climbing mode.

Figure 5:
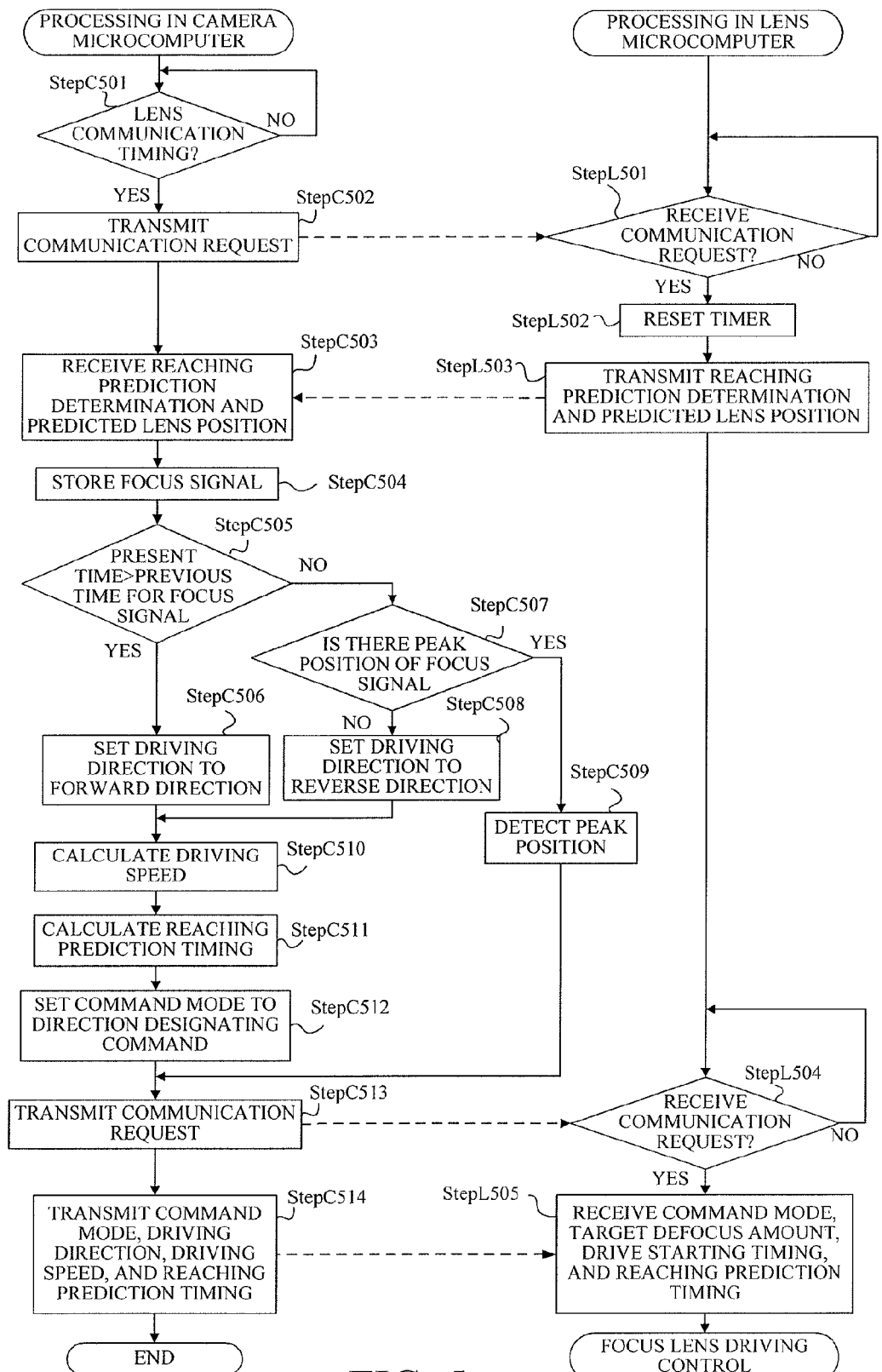
FIG. 5 is a flowchart of mountain-climbing according to the first embodiment.
Figure 6:
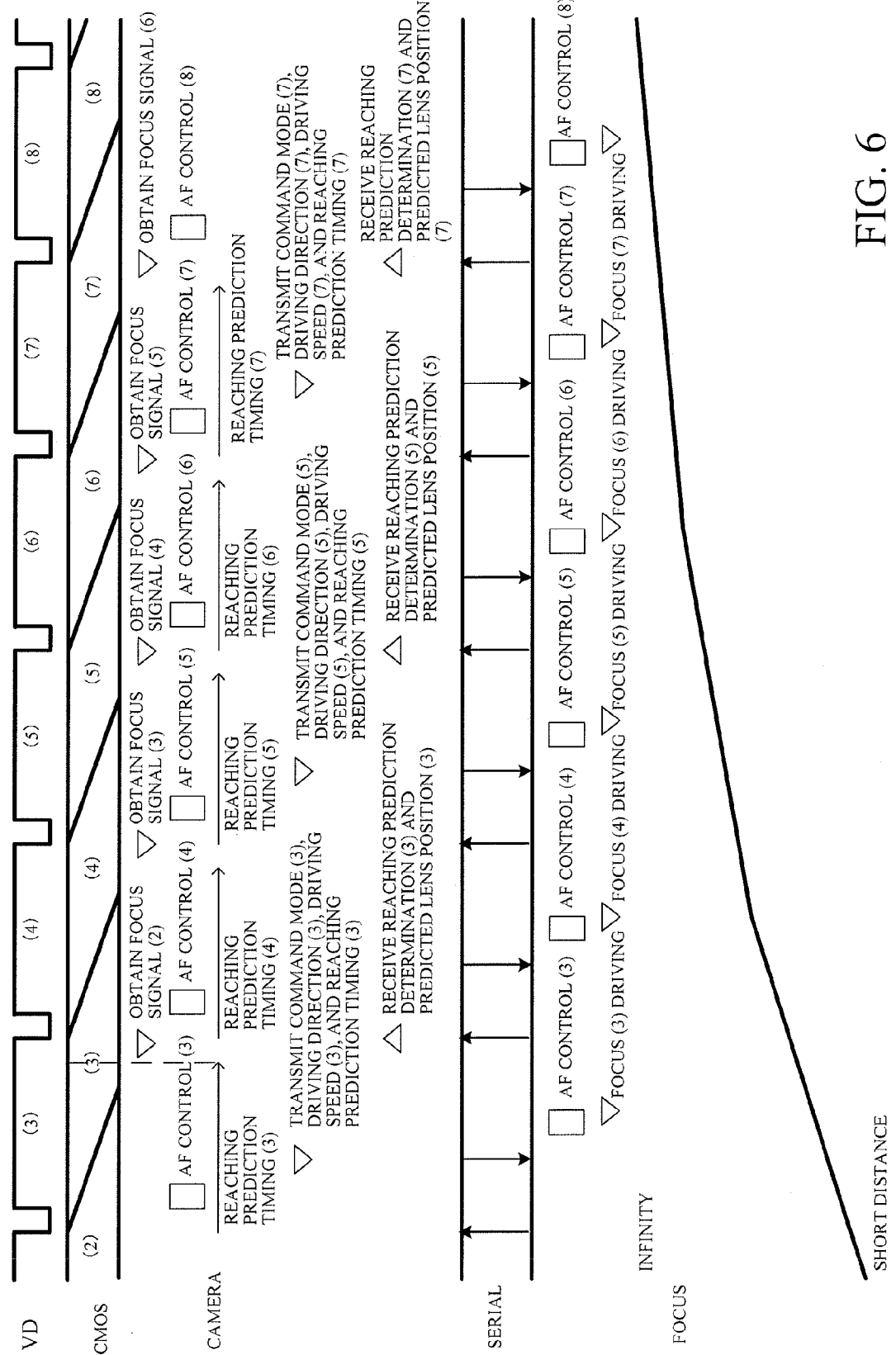
FIG. 6 is a timing chart of the mountain-climbing according to the first embodiment.

Referring now to FIGS. 5 and 6, a description will be given of a control flow over the camera microcomputer C106 and the lens microcomputer L106 in the mountain-climbing the in Step 209.

In Step C501 in FIG. 5, the camera microcomputer C106 determines whether the current timing to the vertical synchronizing signal of the image accords with the predetermined timing for the lens communication. If so the flow moves to Step C502 and if not the flow returns to Step C501 so as to wait the accordance. The timing of the lens communication can be arbitrarily set based upon the accumulation timing of the image signal of the image sensor C101 but a delay time period to the vertical synchronizing signal needs to be constant.

In this embodiment, the camera microcomputer C106 and the lens microcomputer L106 perform a fixed-length packet communication twice in one vertical synchronizing period. In the two communications, a communication performed in Steps C503 and L503 will be referred to as a first communication, and a communication performed at Step C514 and L505 will be referred to as a second communication, as described later.

In the Step C502, the camera microcomputer C106 transmits a communication request to the lens microcomputer L106 and starts the lens communication.

In Step L501, the lens microcomputer L106 determines whether it has received the communication request, which has been transmitted from the camera microcomputer C106 in the Step C502. If so the flow moves to Step L502, and if not the flow returns to the Step L501 for standing by.

In the Step L502, the lens microcomputer L106 resets the internal timer using the start of the first lens communication as a trigger, and measures a delay time period from the start of the lens communication.

In Step L503, the lens microcomputer L106 transmits as a first communication a result of a reaching prediction determination and a predicted lens position calculated in the last processing to the camera microcomputer C106. Although this embodiment conveniently transmits the result of the reaching prediction determination due to the fixed-length packet communication, the result of the reaching prediction result is not actually used for the camera microcomputer C106 because the camera microcomputer C106 does not specifically designate a target position in the mountain-climbing, as described later. The content of the predicted lens position will be described in detail later in Step L1108.

Next, in the step C503, the camera microcomputer C106 receives the result of the reaching prediction determination and the predicted lens position, which have been transmitted from the lens microcomputer L106 in the Step L503. The received prediction lens portion is correlated with the focus signal obtained in the next Step C504, which will be described later. If the current VD is (4) in the example illustrated in FIG. 6, then the processing corresponds to the timing (3) of receiving the reaching prediction determination, etc.

In Step C504, the camera microcomputer C106 obtains a focus signal, and stores it as the driving history of the focus lens L105. In other words, the obtained focus signal is correlated with the focus signal generated from the image signal accumulated when the focus lens L105 is located at the position in the Step C503 last time. If the current VD is (5) in the example of FIG. 6, then the available focus signal is generated from the image signal accumulated in the VD (3) when the focus lens L105 is driven.

In Step C505, the camera microcomputer C106 compares the level of the focus signal currently obtained in Step C504 with the level of the focus signal previously obtained in Step C504. If the former is larger, then the flow moves to the Step C506, and if not, then the flow moves to the Step C507.

In Step C506, the camera microcomputer C106 sets the next driving direction to the same direction as the current direction because the focus signal is increasing. This embodiment designates a driving direction utilizing data area (second data area) used to set data of the image plane amplitude amount in the wobbling. More specifically, the driving direction is designated based upon code information of a numerical value set to the data area. In this embodiment, the image plane amplitude amount set in the wobbling and the driving direction set in the mountain-climbing are set to the corresponding data area (second data area). Other than this method, the driving direction may be designated by separately preparing the communication data.

In Step C507, the camera microcomputer C106 determines whether the peak of the focus signal has already found. If so the flow moves to Step C509, and if not the flow moves to Step C508.

In Step C508, the camera microcomputer C106 sets the next driving direction to a direction reverse to the current direction because the focus signal is decreasing although the peak of the focus signal has not yet been found. As described above, this embodiment designates the driving direction utilizing data area (second data area) used to set data of the image plane amplitude amount in the wobbling and code information of the numerical value used to set the data area.

In Step C509, the camera microcomputer C106 determines the peak of the focus signal. In this case, the flow moves to the step 210 in FIG. 2 then to Step 211 because the peak position has been found, and ends the mountain-climbing.

In Step C510, the camera microcomputer C106 calculates the driving speed of the focus lens L105 as the focus moving speed on the image plane. This driving speed is set so that the focus moving amount can fall within the depth of focus per a time period necessary to obtain one focus signal.

In Step C511, the camera microcomputer C106 calculates the timing for the reaching prediction of the focus lens L105 obtained in the step C503. In other words, the camera microcomputer C106 sets the timing at which the lens position is predicted. This timing is based upon the charge accumulation start timing of the image signal of the image sensor C101 in the Steps C309 and C319 in the wobbling. On the other hand, the reaching prediction timing is set based upon the charge accumulation center timing of the image signal of the image sensor C101 in the Step C511. If the current VD is (3) in the example of FIG. 6, the center timing in the necessary accumulation (3) period for the image sensor C101 becomes the lens reaching prediction timing (3). This embodiment defines the reaching prediction timing as a delay time period from the start of the first lens communication. However, the present invention is not limited to this embodiment, and the reaching prediction timing may be defined as a delay time period to the vertical synchronizing signal, etc.

In Step C512, the command mode is set to the direction designating command so as to inform the lens microcomputer L106 of the command of designating the driving direction.

In the Step C513, the camera microcomputer C106 again transmits a communication request to the lens microcomputer L106, and starts the lens communication.

In Step L504, the lens microcomputer L106 determines whether the lens microcomputer L106 has received the communication request, which has been transmitted from the camera microcomputer C106 in the Step C513. If so the flow moves to the Step L505, and if not the flow returns to the Step L504 for standing by.

In the Step C514, when the lens communication starts, the camera microcomputer C106 transmits information on driving of the focus lens L105 as the second communication to the lens microcomputer L106. The information on driving of the focus lens L105 contains the command mode set in the step C512. It also contains the driving direction etc. set in the Step C506 or C508. It also contains the driving speed calculated in the Step C510, the reaching prediction timing calculated in the Step C511, etc. If the current VD is (3) in the example of FIG. 6, this processing corresponds to the transmission timing of the command mode (3), the driving direction (3), etc.

In the mountain-climbing, the focus lens L105 is always driven, and it is unnecessary for the camera microcomputer C106 to designate the drive starting timing. However, in the fixed-length packet communication, it is necessary to input a certain numerical value in the data area (third data area) used to set drive starting timing in the Step C327 in the wobbling. Accordingly, the camera microcomputer C106 sets an arbitrary numerical value to the data area, but the lens microcomputer L106 invalidates the set numerical value as described later and does not use it to control driving of the focus lens L105.

In Step L505, the lens microcomputer L106 receives information on driving of the focus lens L105, such as a command mode and a driving direction, sent from the camera microcomputer C106 in the Step C514. Thereafter, the lens microcomputer L106 controls driving of the focus lens as described later on the basis of the received information.

Figure 11:
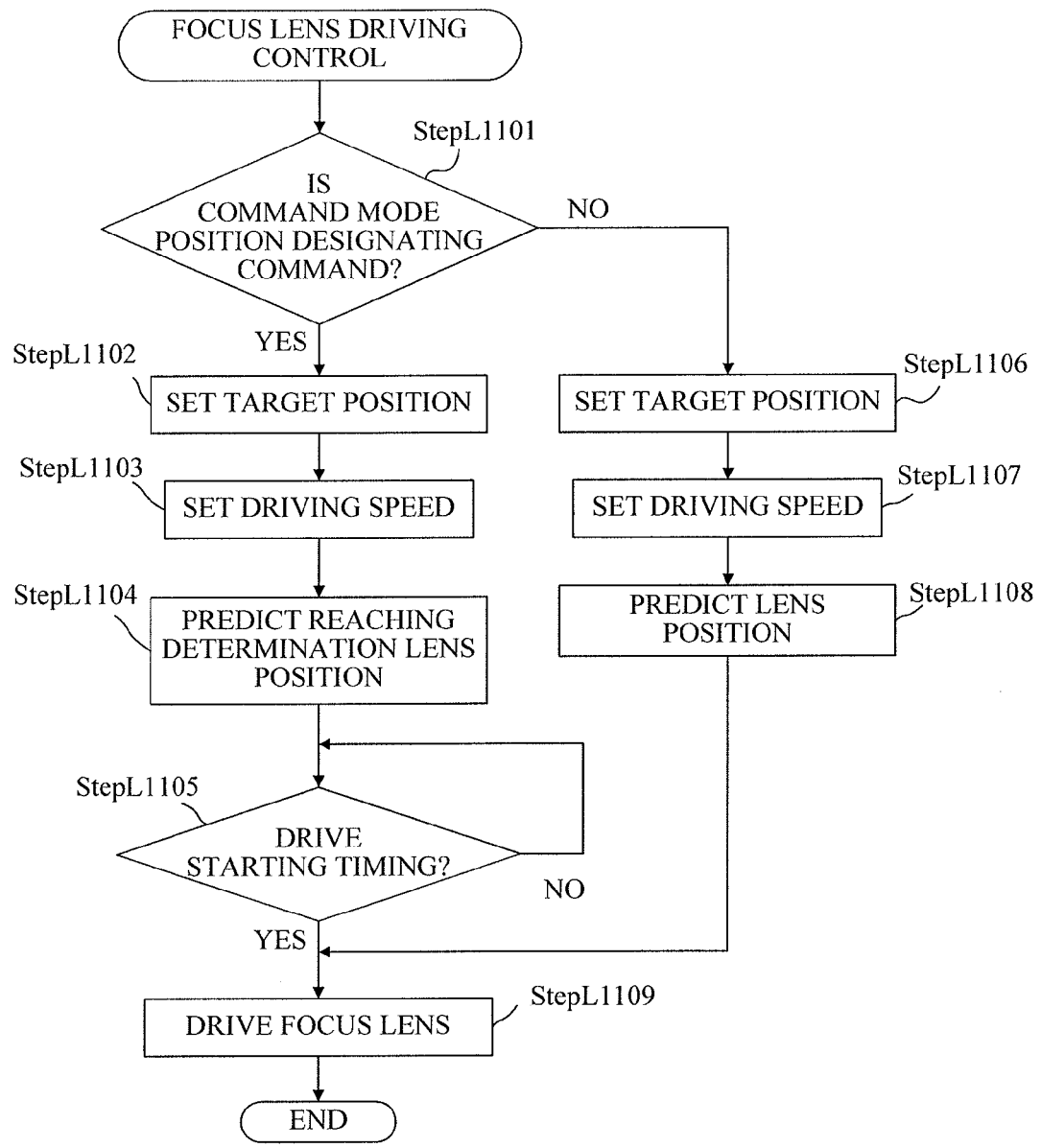
FIG. 11 is a flowchart of a focus lens driving control.

Referring now to FIG. 11, a description will be given of the focus lens drive control by the lens microcomputer L106 after the Steps L305 in FIG. 3B and Step L505 in FIG. 5.

In Step 1101, the lens microcomputer L106 determines whether the command mode received in Steps L305 or L505 is the position designating command. If so the flow moves to the Step 1102, and if not the flow moves to the Step 1106.

In the Step 1102, the lens microcomputer L106 calculates an actual drive amount (actual moving amount) of the focus lens L105, and sets the target position. Herein, the actual drive amount is calculated by considering the current focus position sensitivity so as to obtain a target focus amount received in the step L305.

In the Step 1103, the lens microcomputer L106 calculates a driving speed of the focus lens L105 in accordance with the actual drive amount found in the Step 1102. The driving speed is calculated based upon the characteristic of the focus actuator L108 by considering the influence of noises and overshooting in the operation of the focus lens L105. In order to reduce noises and prevent stepping out, the lens microcomputer L106 can vary the driving speed of the focus lens L105 at arbitrary timing.

In Step 1104, the lens microcomputer L106 predicts a position which the focus lens L105 reaches when it is driven by the driving speed calculated in the Step 1103 from the drive starting timing to the reaching prediction timing received in the Step L305. In other words, the lens microcomputer L106 predicts the position of the focus lens L105 at the reaching prediction timing received in the Step L305 when the focus lens is driven at the driving speed calculated in the Step 1103 at the drive starting timing received in the step L305. By comparing the predicted position of the focus lens L105 with the target position set in the Step 1102, the lens microcomputer L106 determines whether the focus lens can reach the target position within a predetermined permissible time period after the reaching prediction timing received in the Step L305. It is determined whether the target defocus amount requested by the camera microcomputer C106 can be obtained. The result of the reaching prediction determination is sent from the lens microcomputer L106 to the camera microcomputer C106 in the next Step L303.

In Step 1105, the lens microcomputer L106 determines whether the delay time from the starting time of the first lens communication accords with the drive starting timing received in the Step L305 based upon a value of the internal timer reset in the Step L302. If the delay time accords, the flow moves to the Step 1109 and if not, the flow returns to the Step 1105 for standing by.

In Step 1109, lens microcomputer L106 sets the target position set in the Step 1102 and the driving speed calculated in the Step 1103 to the focus actuator L108, and actually drives the focus lens L105. If the current VD is (5) in the example of FIG. 4, this processing corresponds to the timing of focus (6) driving.

On the other hand, when the command mode is not the position designating command in the Step 1101, the command mode is the direction designating command and the flow moves to Step 1106. In Step 1106, the lens microcomputer L106 sets the target position of the focus lens L105. The camera microcomputer C106 does not designate a specific target position in the direction designating command. Therefore, the lens microcomputer L106 can freely set an actual target position as long as the driving direction received in the Step L505 can be guaranteed.

In Step 1107, the lens microcomputer L106 calculates the driving speed of the focus lens L105. The driving speed is calculated by converting the driving speed on the image-pickup plane received in the Step L505 into an actual lens driving speed by considering the current focus position sensitivity.

In Step 1108, the lens microcomputer L106 predicts the position of the focus lens L105 at the reaching prediction timing received in the Step L505 when the focus lens L105 is driven by the driving speed calculated in the Step 1107. The reaching prediction result is transmitted from the lens microcomputer L106 to the camera microcomputer C106 in the next Step L503.

In Step 1109, the lens microcomputer L106 sets the target position set in the Step 1106 and the driving speed calculated in the Step 1107 to the focus actuator L108, and actually drives the focus lens L105. If the current VD is (3) in the example of FIG. 6, this processing corresponds to the timing of focus (3) driving timing. Since it is necessary to strictly manage the timing of driving and halting the focus lens L105 in wobbling of the position designating command, the camera microcomputer C106 needs to designate the drive starting timing. On the other hand, the focus lens L105 is always driven in the mountain-climbing of the direction designating command, and it is unnecessary to newly designate the drive starting timing.

Thus, according to this embodiment, the lens microcomputer L106 switches validity/invalidity of the information set to a specific data area in accordance with the received command mode. More specifically, the lens microcomputer L106 controls driving of the focus lens L105 by using information set to the data area (third data area) of the drive starting timing for the position designating command, and does not utilize information set to the data area to control driving of the focus lens L105 in the direction designating command. This configuration enables the TVAF control command corresponding to each of wobbling and mountain-climbing to be communicated without changing a communication format in accordance with the command mode.

This embodiment moves the focus lens L105 by repeating the restart determination, wobbling, mountain-climbing, stopping, wobbling and restart determination in the TVAF control in this order. Thereby, an in-focus state can be maintained so that the focus signal can always have a maximum level.

According to this embodiment, the camera body sends information on driving of the focus lens L105 to the lens unit, and the lens unit sends information on the position of the focus lens L105 to the camera body. As a result, the camera body can always recognize a cycle of the TVAF control in advance as in the lens integrated type camera even when lens units to be attached to the camera body have different optical characteristics. As a result, the camera body can provide excellent TVAF control.

Second Embodiment

A description will be given of a second embodiment according to the present invention. In the first embodiment, the camera body sends the reaching prediction timing to the lens unit. The lens unit predicts whether the focus lens can reach the target position at the reaching prediction timing and sends the reaching prediction result back to the camera body. On the other hand, according to this embodiment, the lens unit predicts the actual driving amount of the focus lens at the reaching prediction timing received from the camera body, converts it into the defocus amount on the image-pickup plane, and sends the defocus amount predicted result back to the camera body.

The structure of the lens exchangeable type camera system according to this embodiment is similar to that of the first embodiment (FIG. 1). An overall flow of the TVAF control is similar to that of the first embodiment (FIG. 2).

Figure 7A:
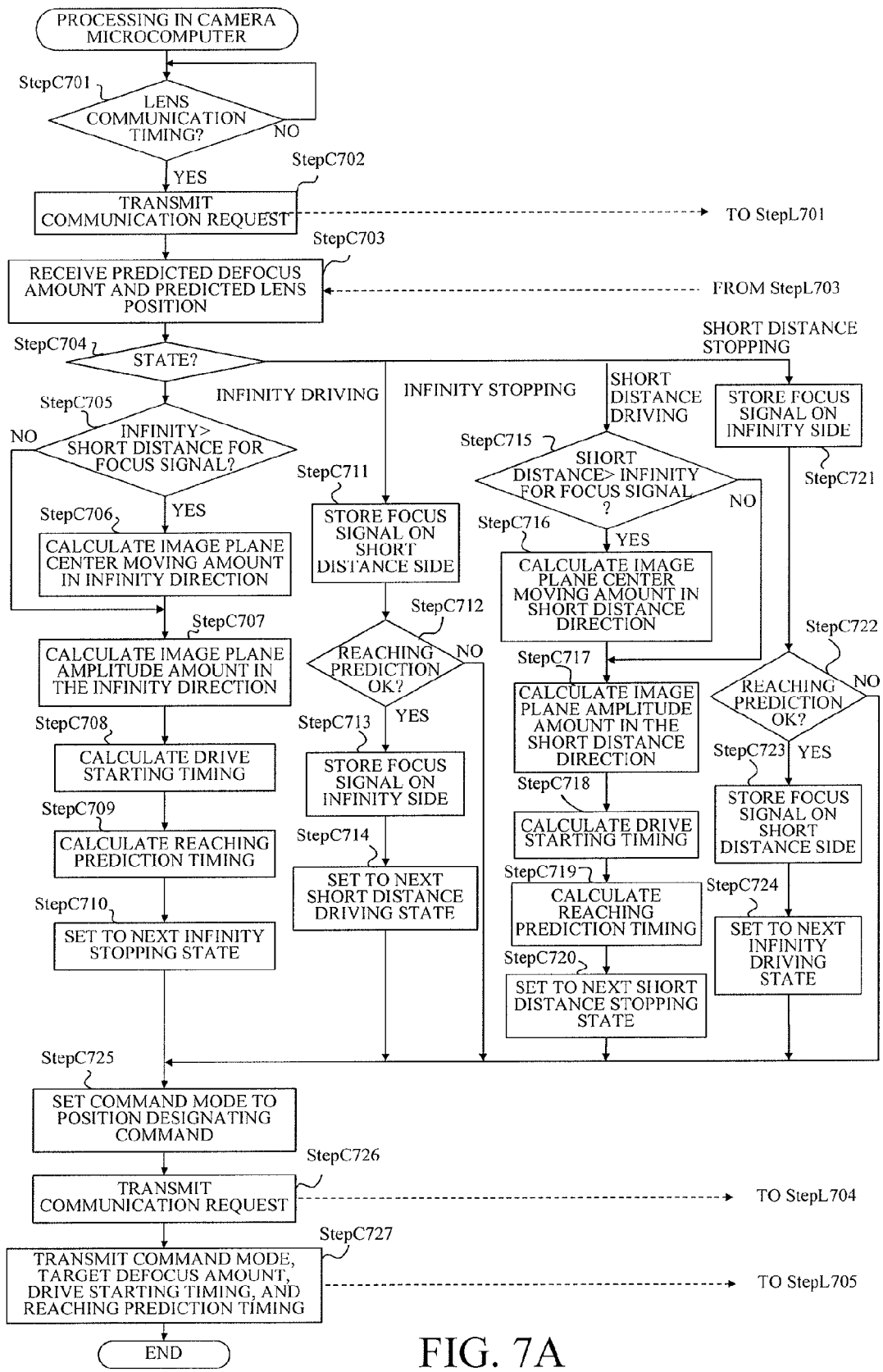
FIGS. 7A and 7B are flowcharts of wobbling according to a second embodiment.
Figure 7B:
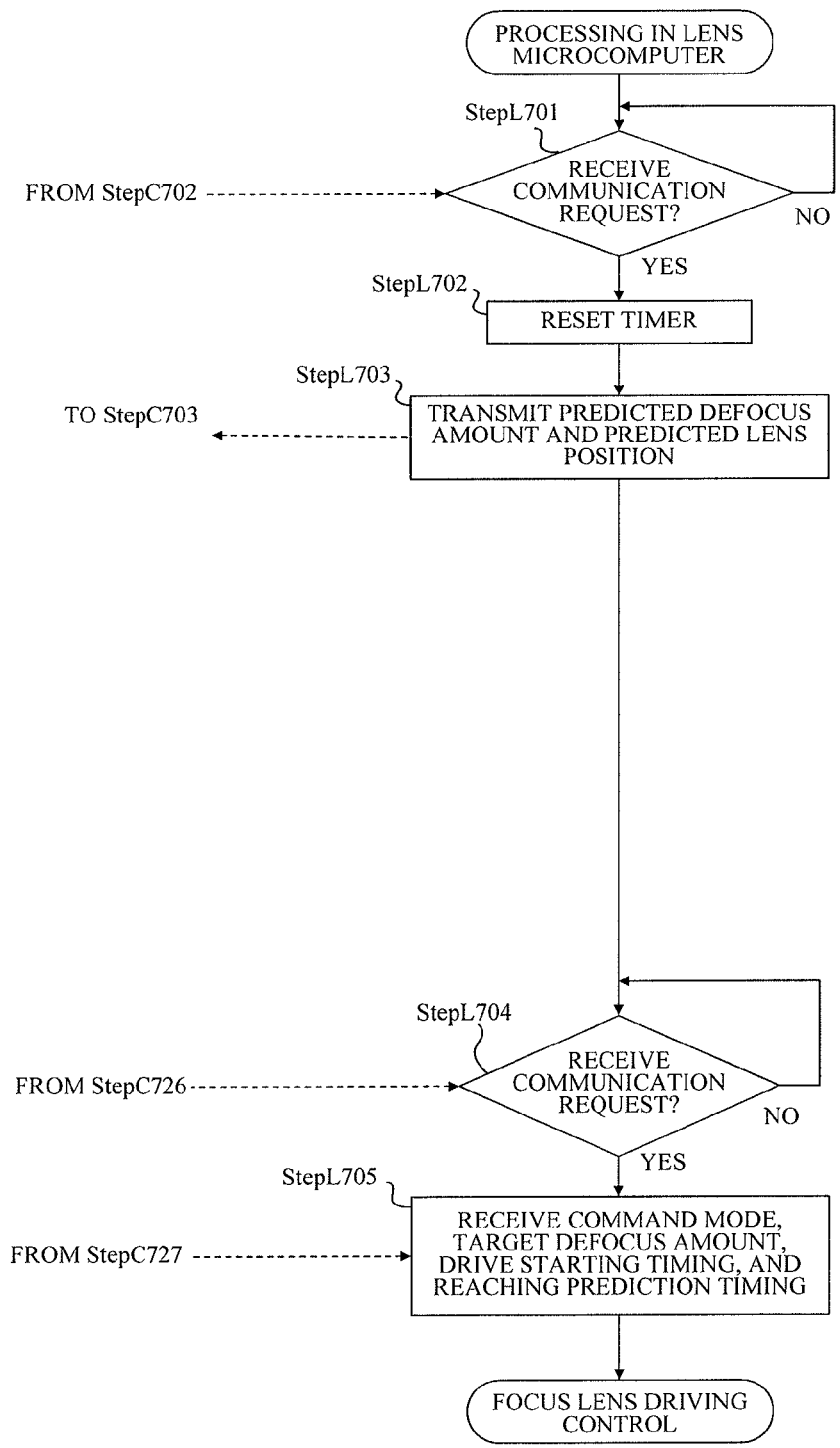
Figure 8:
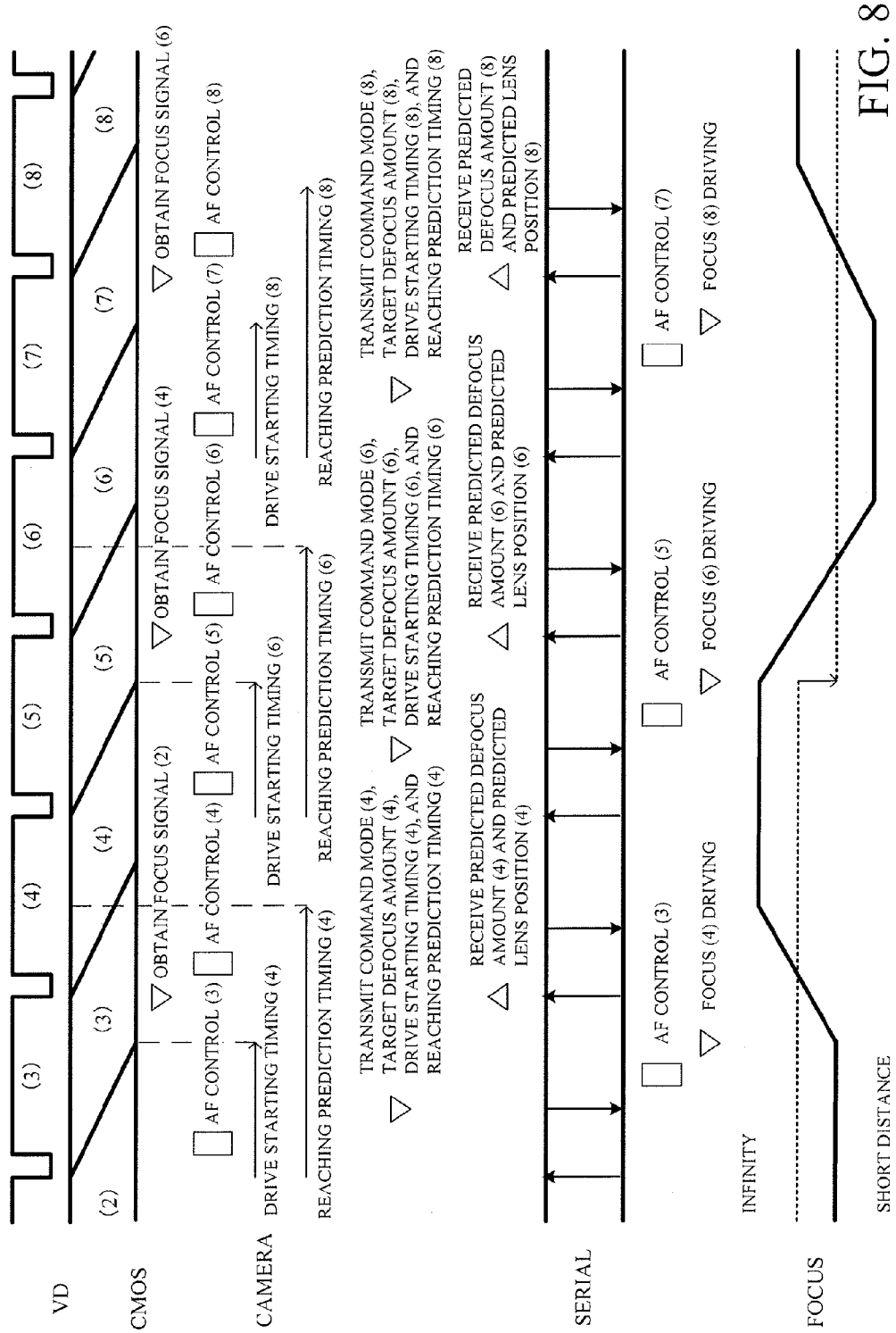
FIG. 8 is a timing chart of the wobbling according to the second embodiment.

Referring now to FIGS. 7 and 8, a description will be given of controls of the camera microcomputer C106 and the lens microcomputer L106 in the wobbling in the Step 202 illustrated in FIG. 2.

In FIG. 7A, in Step C701, the camera microcomputer C106 determines whether the current timing for the vertical synchronizing signal of the image accords with the predetermined timing of the lens communication with the lens microcomputer L106. If so the flow moves to Step C702, and if not the flow returns to the Step C701 for standing by. The timing of the lens communication for the vertical synchronizing signal can be arbitrarily set based upon the image signal accumulation timing of the image sensor C101 but a delay time period to the vertical synchronizing signal needs to be constant.

Even in this embodiment, the camera microcomputer C106 and the lens microcomputer L106 perform a fixed-length packet communication twice in one vertical synchronizing period. In the two communications, a communication performed at Steps C703 and L703 will be referred to as a first communication, and a communication performed at Step C727 and L705 will be referred to as a second communication, as described later.

In the Step C702, the camera microcomputer C106 transmits a communication request to the lens microcomputer L106 and starts the lens communication.

In Step L701, the lens microcomputer L106 determines whether it has received the communication request, which has been transmitted from the camera microcomputer C106 in the Step C702. If so the flow moves to Step L702, and if not the flow returns to the Step L701 for standing by.

In the Step L702, the lens microcomputer L106 resets the internal timer using the start of the first lens communication as a trigger, and measures a delay time period from the start of the lens communication.

In Step L703, the lens microcomputer L106 transmits as a first communication a result of a reaching defocus amount and a prediction lens position calculated in the last processing to the camera microcomputer C106. The content of the reaching defocus amount and predicted lens position will be described in detail later in Step L1104.

In the Step C703, the camera microcomputer C106 receives the result of the reaching prediction determination and the predicted lens position, which have been transmitted from the lens microcomputer L106 in the Step L703. If the current VD is (4) in the example illustrated in FIG. 8, then the processing corresponds to the timing (4) of receiving the reaching prediction, etc.

In Step C704, the camera microcomputer C106 determines which of infinity driving, infinity stopping, short distance driving, and short distance stopping the current control state is. If the current control is the infinity driving, then the flow moves to Step C705. If the current control is the infinity stopping, then the flow moves to Step C711. If the current control is the short distance driving, then the flow moves to Step C715. If the current control is the short distance stopping, then the flow moves to Step C721.

In the Step C705, the camera microcomputer C106 compares the level of the focus signal on the infinity side stored in the last step C721 with the level of the focus signal on the short distance side stored in the last Step C711. If the former is larger, then the flow moves to the Step C706, and if not, then the flow moves to the Step C707. If the current VD is (7) in the example of FIG. 8, then the focus signal (4) is compared with the focus signal (2).

In the Step C706, the camera microcomputer C106 calculates, as a defocus amount on the image-pickup plane, an (image plane center) moving amount in the infinity direction of the center position that is the driving center of the focus lens L105. This defocus amount is set to a value within the depth of focus.

In the Step C707, the camera microcomputer C106 calculates, as a defocus amount on the image-pickup plane, a driving amount (image plane amplitude amount) in the infinity direction of the center position of the focus lens L105. Similar to the moving amount of the center position, this defocus amount is set to a value within the depth of focus.

In the Step C708, the camera microcomputer C106 calculates the drive starting timing used to actually drive the focus lens L105 by a (target) defocus amount calculated in the Steps C706 and C707. Herein, the drive staring timing is set based upon the accumulation completing timing of the image signal of the image sensor C101. If the current VD is (3) in the example of FIG. 8, the timing at which the accumulation (2) of the image sensor C101 is completed is the lens drive starting timing (4). This embodiment sets the timing at which the accumulation (2) of the image sensor C101 is completed to the lens drive starting timing (4). However, the lens drive starting timing (4) may be determined in accordance with the accumulation completion timing of the focus detecting area among the output signal in all pixels of the image sensor C101. This embodiment defines this drive starting timing as a delay time period from the start of the first communication. However, the present invention is not limited to this embodiment, and the drive starting timing may be defined as a delay time period to the vertical synchronizing signal, etc.

In Step C709, the camera microcomputer C106 calculates the reaching prediction timing used to obtain the next target defocus amount when the focus lens L105 is driven at the drive starting timing calculated in the Step C708. A proper target defocus amount can be obtained if the focus lens L105 reaches the target position a predetermined permissible time period after the reaching prediction timing, and the reaching prediction timing is set based upon the charge accumulation start timing of the image signal of the image sensor C101. If the current VD is (3) in the example of FIG. 8, the reaching prediction timing (4) is the predetermined time period after the accumulation (4) of the image sensor C101 starts. This embodiment sets the reaching prediction timing (4) to the predetermined time period after the accumulation (4) of the image sensor C101 starts. However, the reaching prediction timing (4) may be determined based upon the accumulation start timing of the focus detecting area among the output signal in all pixels of the image sensor C101. According to this embodiment, this reaching prediction timing is defined as the delay time period from the start of the first communication. However, the present invention is not limited to this embodiment, and the reaching prediction timing may be defined as a delay time period from a vertical synchronizing signal, etc.

In the Step C710, the camera microcomputer C106 sets the next control state to the infinite stopping state.

When the current control state is the infinity stopping state in the Step C704, the camera microcomputer C106 obtains a focus signal and stores the signal as information obtained when the focus lens L105 stops on the short distance side in Step C711. In other words, the obtained signal is correlated with a focus signal generated from the image signal accumulated when the focus lens L105 is previously located at the position stored in the Step C723, which will be described later. If the current VD is (4) in the example of FIG. 8, the available focus signal is a signal generated from the image signal accumulated with VD(2), when the focus lens L105 stops on the short distance side.

In the Step C712, the camera microcomputer C106 determines whether the last result of the predicted defocus amount received in the Step C703 accords with the target defocus amount designated in the Steps C706 and C707 (reaching prediction determination). In other words, the camera microcomputer C106 determines whether the desired defocus amount has been available. If so the flow moves to the Step C713, and if not the flow moves to the Step C725. If the last prediction is non-accordance, the focus lens L105 is currently driving and the next available focus signal is unlikely to obtain the proper defocus amount. It is therefore necessary to delay a cycle of the TVAF control so as to avoid the malfunction.

In the Step C713, the camera microcomputer C106 recognizes that the focus lens L105 has reached the target position and stores the current position. The stored focus position is correlated with the focus signal obtained in Step C721, which will be described later.

In the Step C714, the camera microcomputer C106 sets the next control state to the short distance driving state.

When the current control state is determined to be the short distance driving state in the Step C704, the camera microcomputer C106 in the Step C715 compares the level of the focus signal on the short distance side stored in the last step C711 with the level of the focus signal on the infinity side stored in the last Step C721. If the former is larger, then the flow moves to the Step C716, and if not, then the flow moves to the Step C717. If the current VD is (5) in the example of FIG. 8, then the focus signal (2) is compared with the focus signal (0) (not illustrated).

In the Step C716, the camera microcomputer C106 calculates, as a defocus amount on the image-pickup plane, an (image plane center) moving amount in the short distance direction of the center position that is the driving center of the focus lens L105. This defocus amount is set to a value within the depth of focus.

In the Step C717, the camera microcomputer C106 calculates, as a defocus amount on the image-pickup plane, a driving amount (image plane amplitude amount) in the short distance direction of the center position of the focus lens L105. Similar to the moving amount of the center position, this defocus amount is set to a value within the depth of focus.

In the Step C718, the camera microcomputer C106 calculates the drive starting timing used to actually drive the focus lens L105. The drive staring timing is set based upon the accumulation completing timing of an image signal of the image sensor C101. If the current VD is (5) in the example of FIG. 8, the lens drive starting timing (6) is timing at which the accumulation (4) of the image sensor C101 is completed. In this embodiment, the lens drive starting timing (6) is timing at which the accumulation (4) of the image sensor C101 is completed. However, the lens drive starting timing (6) may be determined based upon the accumulation completion timing of the focus detecting area among the output signal from all pixels in the image sensor C101. This embodiment defines this lens drive starting timing as a delay time period from the start of the first communication. However, the present invention is not limited to this embodiment, and the lens drive starting timing may be defined as a delay time period to the vertical synchronizing signal, etc.

In Step C719, the camera microcomputer C106 calculates the reaching prediction timing used to obtain the next target defocus amount when the focus lens L105 is driven at the drive starting timing calculated in the Step C718. The reaching prediction timing is set based upon the charge accumulation start timing of the image signal of the image sensor C101. When the current VD is (5) in the example of FIG. 8, the reaching prediction timing (6) is the predetermined time period after the accumulation (6) of the image sensor C101 starts. In this embodiment, the reaching prediction timing (6) is the predetermined time period after the accumulation (6) of the image sensor C101 starts. However, the reaching prediction timing (6) may be determined based upon the accumulation start timing of the focus detecting area among the output signal from all pixels of the image sensor C101. According to this embodiment, this reaching prediction timing is defined as a delay time period from the start of the first communication. However, the present invention is not limited to this embodiment, and the reaching prediction timing may be defined as a delay time period to a vertical synchronizing signal, etc.

In the Step C720, the camera microcomputer C106 sets the next control state to the short distance stopping state.

When the current control state is the short distance stopping state in the Step C704, the camera microcomputer C106 obtains a focus signal and stores the signal as information obtained when the focus lens L105 stops at the infinity side in Step C721. The obtained signal is correlated with a focus signal generated from the image signal accumulated when the focus lens L105 is located at the position stored in the last Step C713. If the current VD is (6) in the example of FIG. 8, the available focus signal is a signal generated from the image signal stored with VD(4), when the focus lens L105 stops on the infinity side.

In the Step C722, the camera microcomputer C106 determines whether the last result of the predicted defocus amount received in the Step C703 accords with the target defocus amount designated by the Steps C716 and C717 (reaching prediction determination). In other words, the camera microcomputer C106 determines whether the desired defocus amount is available. If so the flow moves to the Step C723, and if not the flow moves to Step C725. If the last prediction is non-accordance, the focus lens L105 is currently driving and the next available focus signal is unlikely to obtain the proper defocus amount. It is therefore necessary to delay a cycle of the TVAF control so as to avoid the malfunction.

In the Step C723, the camera microcomputer C106 recognizes that the focus lens L105 has reached the target position and stores the current position. The stored focus position is correlated with the focus signal obtained in the step C711.

In the step C724, the camera microcomputer C106 sets the next control state to the infinity driving state.

In Step C725, the current driving command is a command of directly or indirectly designating the target position, and thus command mode is set to a position designating command. In this embodiment, this command mode includes two types, i.e., the position designating command and the direction designating command, which will be described later, but may include a stopping command, an invalid command, etc. The camera microcomputer C106 can set one command mode among the position designating command, the direction designating command, the stopping command, and the valid command. The position designating command is a first control that provides control by designating a driving target position of the focus lens, and the direction designating command is a second control that provides control by designating a driving direction of the focus lens.

In the Step C726, the camera microcomputer C106 again transmits the communication request to the lens microcomputer L106 and starts the lens communication.

In the Step L704, the lens microcomputer L106 determines whether the lens microcomputer L106 has received the communication request, which has been transmitted from the camera microcomputer C106 in the Step C726. If so the flow moves to the Step L705, and if not the flow returns to the Step L704 for standing by.

In the Step C727, when the lens communication starts, the camera microcomputer C106 transmits information on driving of the focus lens L105 as the second communication to the lens microcomputer L106. The information on driving of the focus lens L105 contains a command mode set in the Step C725. It also contains a target defocus amount calculated in the Steps C706, C707, C716, and C717, such as the image plane amplitude amount and the image plane center moving amount. It also contains the drive starting timing calculated in the Step C708 or C718 and the reaching prediction timing calculated in the Step C709 or C719. If the current VD is (5) in the example of FIG. 8, this processing corresponds to the transmission timing of the command mode (6) and the target defocus amount (6). In the wobbling, the lens microcomputer L106 sets the driving speed, and thus sets an arbitrary numerical value to the data area (first data area) used to set the driving speed data. In other words, data set to the data area of the driving speed (the driving speed (6)) is not used for the lens unit. The arbitrary numerical value is set to the data area of the driving speed, although it is not used by the lens unit, because the camera microcomputer C106 and the lens microcomputer L106 provide a fixed-length packet communication.

In the Step L705, the lens microcomputer L106 receives information on the driving of the focus lens, such as the command mode and the target defocus amount, transmitted from the camera microcomputer C106 in the Step C727. Thereafter, the lens microcomputer L106 provides driving control of the focus lens based upon the received information, as described later.

After the wobbling processing, the camera microcomputer C106 determines whether the focus lens L105 has reciprocated in the same area a predetermined number of times (NB). When determining that the focus lens L105 has reciprocated in the same area the predetermined number of times (NB), the camera microcomputer C106 calculates an in-focus position based upon the past lens position information and determines the in-focus. Then, the flow moves to the restart determining mode because the in-focus has been determined in the Step 203 in FIG. 2.

When determining that the focus lens L105 has not yet reciprocated in the same area the predetermined number of times (NB), the camera microcomputer C106 determines whether the same in-focus has been detected a predetermined number of times (NB). If the in-focus direction is detected the predetermined number of times (NB), the camera microcomputer C106 determines that the in-focus direction. In this case, the Step 204 moves to the Step 205 in FIG. 2, the in-focus direction is determined, and the flow moves to the mountain-climbing mode.

The control flow of the camera microcomputer C106 and the lens microcomputer L106 in the mountain-climbing in the Step 209 in FIG. 2 is the same as that in the first embodiment (FIGS. 5 and 6). The control flow of driving the focus lens by the lens microcomputer L106 after the Step L705 in FIG. 7B and the Step L505 in FIG. 5 is the same as that of the first embodiment (FIG. 11). The content of the Step 1104 of the above FIG. 11 will be read as follows: "by comparing the predicted position of the focus lens L105 with the target position set in the Step 1102, the lens microcomputer L106 determines whether the focus lens can reach the target position a predetermined permissible time period after the reaching prediction timing received in the Step L305. It is determined whether the target defocus amount requested by the camera microcomputer C106 can be obtained. The result of the reaching prediction determination is sent from the lens microcomputer L106 to the camera microcomputer C106 in the next Step L303." is replaced with "it is determined how large the defocus amount is on the image plane corresponding to the predicted position of the focus lens L105. The result of the predicted defocus amount is sent from the lens microcomputer L106 to the camera microcomputer C106 in the next Step L703."

Even in this embodiment, the lens microcomputer L106 switches validity/invalidity of the information set to a specific data area in accordance with the received command mode. More specifically, the lens microcomputer L106 controls driving of the focus lens L105 by using information set to the data area (third data area) of the drive starting timing for the position designating command, and does not use information set to the data area to control driving of the focus lens L105 in the direction designating command. This configuration enables the TVAF control command corresponding to each of wobbling and mountain-climbing to be communicated without changing a communication format in accordance with the command mode.

This embodiment moves the focus lens L105 by repeating the restart determination, wobbling, mountain-climbing, stopping, wobbling and restart determination in the TVAF control in this order. Thereby, an in-focus state can be maintained so that the focus signal can always have a maximum level.

According to this embodiment, the camera body sends information on driving the focus lens L105 to the lens unit, and the lens unit sends information on the position of the focus lens L105 from the lens unit to the camera body. As a result, the camera body can always recognize a cycle of the TVAF control in advance as in the lens integrated type camera even when lens units to be attached to the camera body have different optical characteristics. As a result, the camera body can provide excellent TVAF control.

Third Embodiment

A description will be given of a third embodiment according to the present invention. In the first embodiment, the camera body sends the reaching prediction timing to the lens unit. The lens unit predicts whether the focus lens can reach the target position at the reaching prediction timing and sends the reaching prediction result back to the camera body. In the second embodiment, the lens unit predicts the actual driving amount of the focus lens at the reaching prediction timing received from the camera body, converts it into the defocus amount on the image-pickup plane, and sends the defocus amount predicted result back to the camera body. On the other hand, according to this embodiment, the lens unit sends a time period necessary for the focus lens to reach the target position back to the camera body.

The structure of the lens exchangeable type camera system according to this embodiment is similar to that of the first embodiment (FIG. 1). An overall flow of the TVAF control is similar to that of the first embodiment (FIG. 2).

Figure 9A:
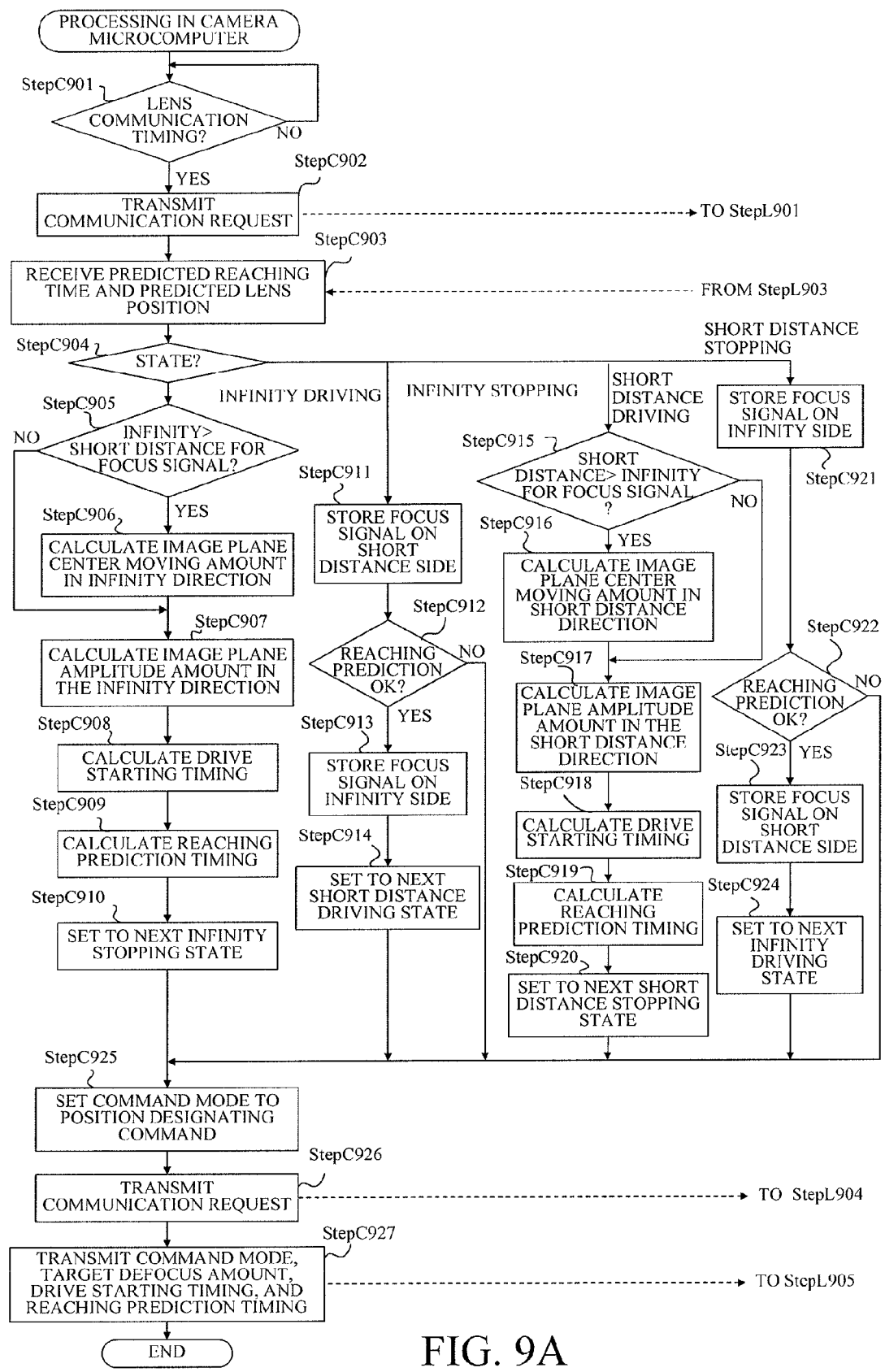
FIGS. 9A and 9B are flowcharts of wobbling according to a third embodiment.
Figure 9B:
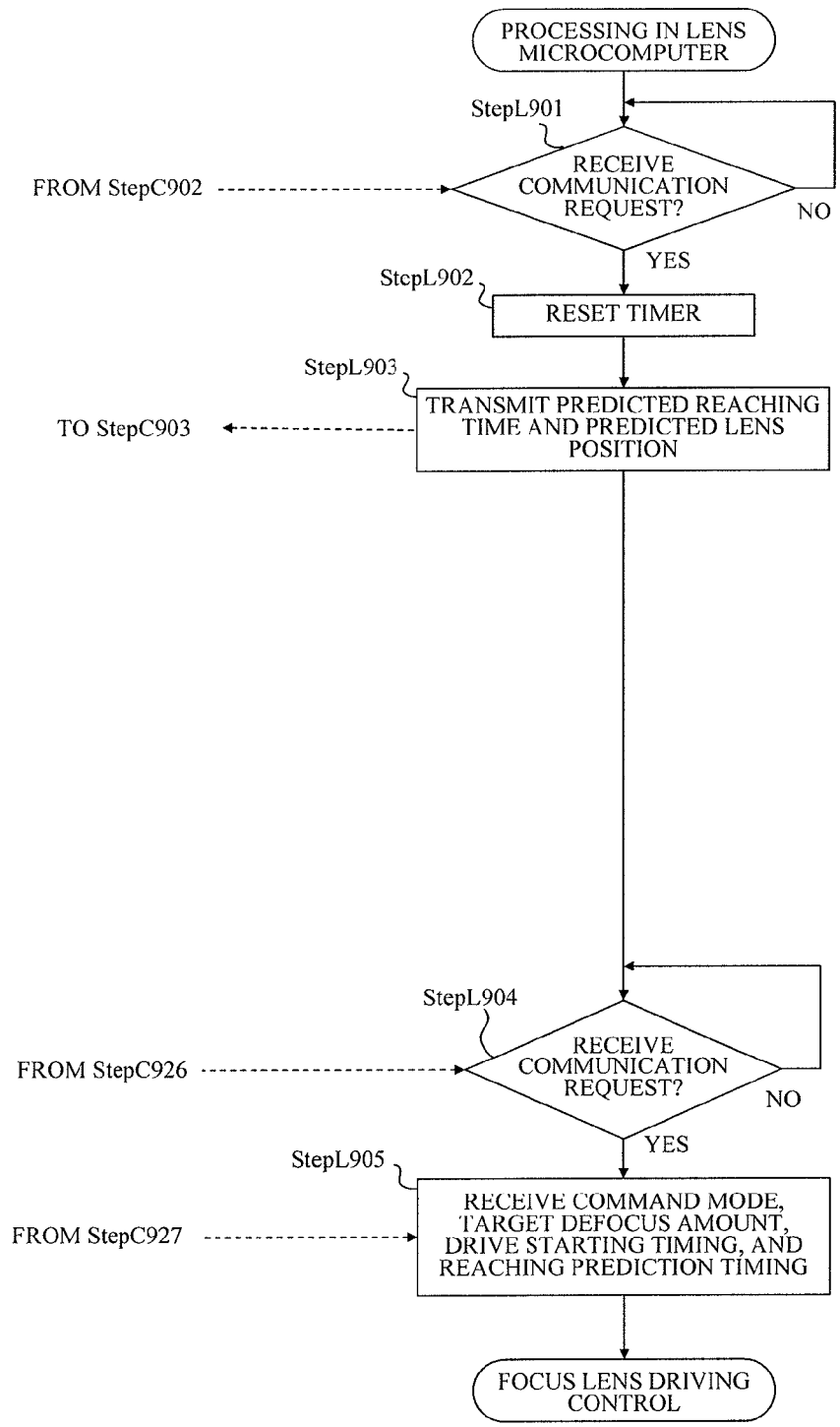
Figure 10:
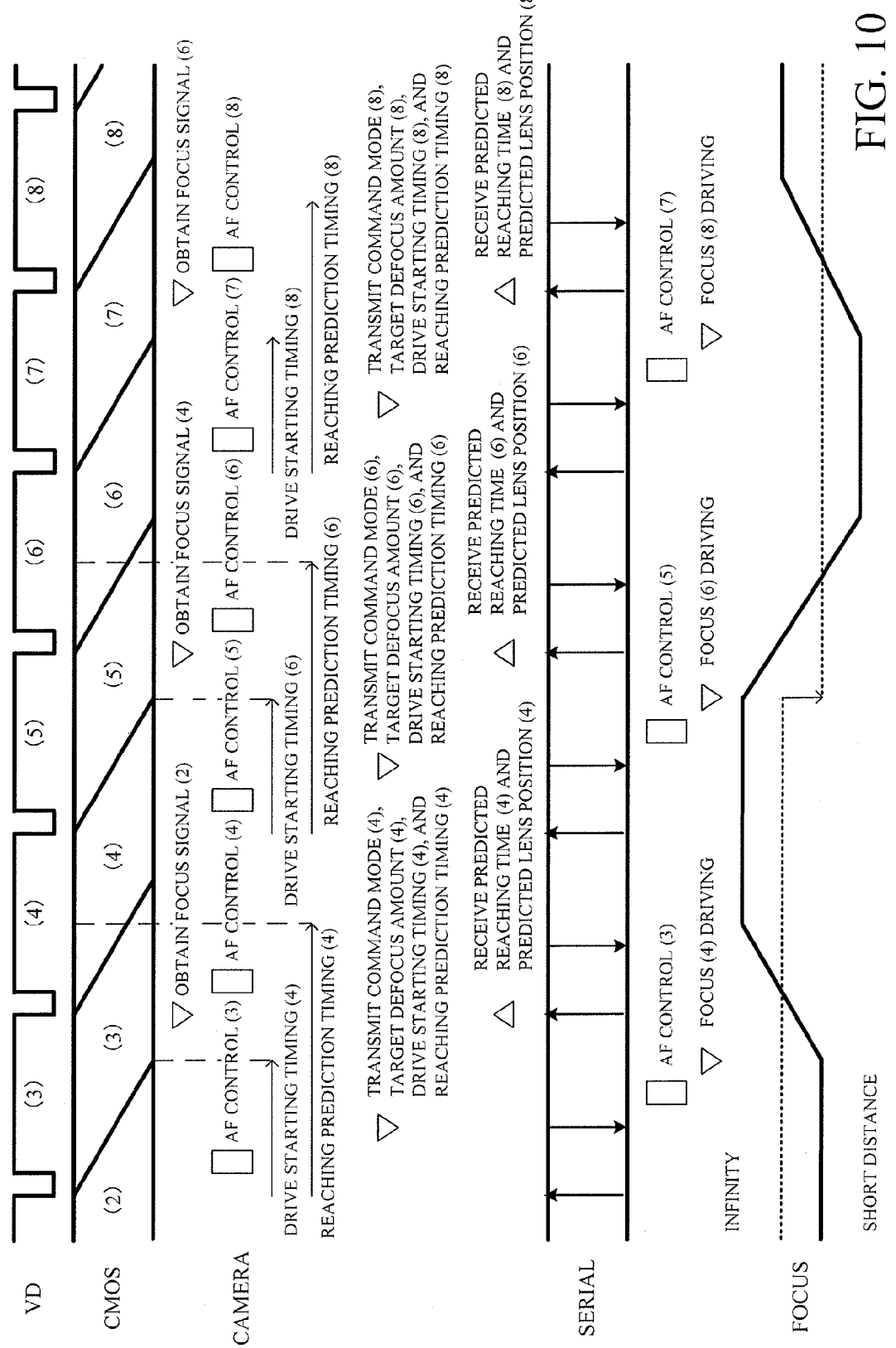
FIG. 10 is a timing chart of the wobbling according to the third embodiment.

Referring now to FIGS. 9 and 10, a description will be given of controls of the camera microcomputer C106 and the lens microcomputer L106 in the wobbling in the Step 202 illustrated in FIG. 2.

In FIG. 9A, in Step C901, the camera microcomputer C106 determines whether the current timing for the vertical synchronizing signal of the image accords with the predetermined timing of the lens communication with the lens microcomputer L106. If so the flow moves to Step C902, and if not the flow returns to the Step C901 for standing by. The timing of the lens communication for the vertical synchronizing signal can be arbitrarily set based upon the image signal accumulation timing of the image sensor C101 but a delay time period to the vertical synchronizing signal needs to be constant.

Even in this embodiment, the camera microcomputer C106 and the lens microcomputer L106 perform a fixed-length packet communication twice in one vertical synchronizing period. In the two communications, a communication performed in Steps C903 and L903 is referred to as a first communication, and a communication performed at Step C927 and L905 is referred to as a second communication, as described later.

In the Step C902, the camera microcomputer C106 transmits a communication request to the lens microcomputer L106 and starts the lens communication.

In Step L901, the lens microcomputer L106 determines whether it has received the communication request, which has been transmitted from the camera microcomputer C106 in the Step C902. If so the flow moves to Step L902, and if not the flow returns to the Step L901 for standing by.

In the Step L902, the lens microcomputer L106 resets the internal timer using the start of the first lens communication as a trigger, and measures a delay time period from the start of the lens communication.

In Step L903, the lens microcomputer L106 transmits as a first communication a result of a predicted reaching time and predicted lens position calculated in the last processing to the camera microcomputer C106. The content of the reaching defocus amount and prediction lens position will be described in detail later in Step L1104.

In the Step C903, the camera microcomputer C106 receives the result of the predicted reaching time and the predicted lens position, which have been transmitted from the lens microcomputer L106 in the Step L903. In the example illustrated in FIG. 10, if the current VD is (4), then the processing corresponds to the timing (4) of receiving the reaching prediction, etc.

In Step C904, the camera microcomputer C106 determines which of infinity driving, infinity stopping, short distance driving, and short distance stopping the current control state is. If the current control is the infinity driving, then the flow moves to Step C905. If the current control is the infinity stopping, then the flow moves to Step C911. If the current control is the short distance driving, then the flow moves to Step C915. If the current control is the short distance stopping, then the flow moves to Step C921.

In the Step C905, the camera microcomputer c106 compares the level of the focus signal on the infinity side stored in the last step C921 with the level of the focus signal on the short distance side stored in the last Step C911. If the former is larger, then the flow moves to the Step C906, and if not, then the flow moves to the Step C907. If the current VD is (7) in the example of FIG. 10, then the focus signal (4) is compared with the focus signal (2).

In the Step C906, the camera microcomputer C106 calculates, as a defocus amount on the image-pickup plane, an (image plane center) moving amount in the infinity direction of the center position that is the driving center of the focus lens L105. This defocus amount is set to a value within the depth of focus.

In the Step C907, the camera microcomputer C106 calculates, as a defocus amount on the image-pickup plane, a driving amount (image plane amplitude amount) in the infinity direction of the center position of the focus lens L105. Similar to the moving amount of the center position, this defocus amount is set to a value within the depth of focus.

In the Step C908, the camera microcomputer C106 calculates the drive starting timing used to actually drive the focus lens L105 by a (target) defocus amount calculated in the Steps C906 and C907. Herein, the drive staring timing is set based upon the accumulation completing timing of the image signal of the image sensor C101. If the current VD is (3) in the example of FIG. 10, the timing at which the accumulation (2) of the image sensor C101 is completed is the lens drive starting timing (4). This embodiment sets the timing at which the accumulation (2) of the image sensor C101 is completed to the lens drive starting timing (4). However, the lens drive starting timing (4) may be determined in accordance with the accumulation completion timing of the focus detecting area among the output signal in all pixels of the image sensor C101. This embodiment defines this drive starting timing as a delay time period from the start of the first communication. However, the present invention is not limited to this embodiment, and the drive starting timing may be defined as a delay time period to the vertical synchronizing signal, etc.

In Step C909, the camera microcomputer C106 calculates the reaching prediction timing used to obtain the next target defocus amount when the focus lens L105 is driven at the drive starting timing calculated in the Step C908. A proper target defocus amount can be obtained if the focus lens L105 reaches the target position a predetermined permissible time period after the reaching prediction timing, and the reaching prediction timing is set based upon the accumulation start timing of the image signal of the image sensor C101. If the current VD is (3) in the example of FIG. 10, the reaching prediction timing (4) is the predetermined time period after the accumulation (4) of the image sensor C101 starts. This embodiment sets the reaching prediction timing (4) to the predetermined time period after the accumulation (4) of the image sensor C101 starts. However, the reaching prediction timing (4) may be determined based upon the accumulation start timing of the focus detecting area among the output signal in all pixels of the image sensor C101. According to this embodiment, this reaching prediction timing is defined as the delay time period from the start of the first communication. However, the present invention is not limited to this embodiment, and the reaching prediction timing may be defined as a delay time period from a vertical synchronizing signal, etc.

In the Step C910, the camera microcomputer C106 sets the next control state to the infinite stopping state.

When the current control state is the infinity stopping state in the Step C904, the camera microcomputer C106 obtains a focus signal and stores the signal as information obtained when the focus lens L105 stops on the short distance side in Step C911. In other words, the obtained signal is correlated with a focus signal generated from the image signal accumulated when the focus lens L105 is previously located at the position stored in the Step C923, which will be described later. If the current VD is (4) in the example of FIG. 10, the available focus signal is a signal generated from the image signal accumulated with VD(2) when the focus lens L105 stops on the short distance side.

In the Step C912, the camera microcomputer C106 determines whether the last result of the predicted reaching time received in the Step C903 is prior to the reaching predicted timing designated in the Step C909 or whether the desired defocus amount has been available. If so, then the flow moves to the Step C913; if not, then the flow moves to the Step C925. If the last prediction is non-accordance, the focus lens L105 is currently driving and the next available focus signal is unlikely to obtain the proper defocus amount. It is therefore necessary to delay a cycle of the TVAF control so as to avoid the malfunction.

In the Step C913, the camera microcomputer C106 recognizes that the focus lens L105 has reached the target position and stores the current position. The stored focus position is correlated with the focus signal obtained in the step C921, which will be described later.

In the step C914, the camera microcomputer C106 sets the next control state to the short distance driving state.

When the current control state is determined to be the short distance driving state in the Step C904, the camera microcomputer C106 in the Step C915 compares the level of the focus signal on the short distance side stored in the previous step C911 with the level of the focus signal on the infinity side stored in the previous Step C921. If the former is larger, then the flow moves to the Step C916, and if not, then the flow moves to the Step C917. If the current VD is (5) in the example of FIG. 10, then the focus signal (2) is compared with the focus signal (0) (not illustrated).

In the Step C916, the camera microcomputer C106 calculates, as a defocus amount on the image-pickup plane, an (image plane center) driving amount in the short distance direction of the center position that is the driving center of the focus lens L105. This defocus amount is set to a value within the depth of focus.

In the Step C917, the camera microcomputer C106 calculates, as a defocus amount on the image-pickup plane, a driving amount (image plane amplitude amount) in the short distance direction of the center position of the focus lens L105. Similar to the moving amount of the center position, this defocus amount is set to a value within the depth of focus.

In the Step C918, the camera microcomputer C106 calculates the drive starting timing used to actually drive the focus lens L105. The drive staring timing is set based upon the accumulation completing timing of an image signal of the image sensor C101. If the current VD is (5) in the example of FIG. 10, the lens drive starting timing (6) is timing at which the accumulation (4) of the image sensor C101 is completed. In this embodiment, the lens drive starting timing (6) is timing at which the accumulation (4) of the image sensor C101 is completed. However, the lens drive starting timing (6) may be determined based upon the accumulation completion timing of the focus detecting area among the output signal from all pixels in the image sensor C101. This embodiment defines this lens drive starting timing as a delay time period from the start of the first communication. However, the present invention is not limited to this embodiment, and the lens drive starting timing may be defined as a delay time period to the vertical synchronizing signal, etc.

In Step C919, the camera microcomputer C106 calculates the reaching prediction timing used to obtain the next target defocus amount when the focus lens L105 is driven at the drive starting timing calculated in the Step C918. The reaching prediction timing is set based upon the charge accumulation start timing of the image signal of the image sensor C101. When the current VD is (5) in the example of FIG. 10, the reaching prediction timing (6) is the predetermined time period after the accumulation (6) of the image sensor C101 starts. In this embodiment, the reaching prediction timing (6) is the predetermined time period after the accumulation (6) of the image sensor C101 starts. However, the reaching prediction timing (6) may be determined based upon the accumulation start timing of the focus detecting area among the output signal from all pixels of the image sensor C101. According to this embodiment, this reaching prediction timing is defined as a delay time period from the start of the first communication. However, the present invention is not limited to this embodiment, and the reaching prediction timing may be defined as a delay time period to a vertical synchronizing signal, etc.

In the Step C920, the camera microcomputer C106 sets the next control state to the short distance stopping state.

When the current control state is the short distance stopping state in the Step C904, the camera microcomputer C106 obtains a focus signal and stores the signal as information obtained when the focus lens L105 stops at the infinity side in Step C921. The obtained signal is correlated with a focus signal generated from the image signal accumulated when the focus lens L105 is located at the position stored in the Step C913 at previous time. If the current VD is (6) in the example of FIG. 10, the available focus signal is a signal generated from the image signal stored with VD(4), when the focus lens L105 stops on the infinity side.

In the Step C922, the camera microcomputer C106 determines whether the last result of the predicted reaching time received in the Step C903 is prior to the reaching predicted timing designated in the Step C919 or whether the requested defocus amount has been available. If so, then the flow moves to the Step C923; if not, then the flow moves to Step C925. If the last prediction is not being prior, the focus lens L105 is currently driving and the next available focus signal is unlikely to obtain the proper defocus amount. Therefore, it is necessary to delay a cycle of the TVAF control so as to avoid the malfunction.

In the Step C923, the camera microcomputer C106 recognizes that the focus lens L105 has reached the target position and stores the current position. The stored focus position is correlated with the focus signal obtained in the step C911.

In the step C924, the camera microcomputer C106 sets the next control state to the infinity driving state.

In Step C925, the current driving command is a command of directly or indirectly designating the target position, and thus command mode is set to a position designating command. In this embodiment, this command mode includes two types, i.e., the position designating command and the direction designating command, which will be described later, but may include a stopping command, an invalid command, etc. The camera microcomputer C106 can set one command mode among the position designating command, the direction designating command, the stopping command, and the valid command. The position designating command is a first control that provides control by designating a driving target position of the focus lens, and the direction designating command is a second control that provides control by designating a driving direction of the focus lens.

In the Step C926, the camera microcomputer C106 again transmits the communication request to the lens microcomputer L106 and starts the lens communication.

In the Step L904, the lens microcomputer L106 determines whether the lens microcomputer L106 has received the communication request, which has been transmitted from the camera microcomputer C106 in the step C926, and if so the flow moves to the Step L905, and if not the flow returns to the Step L904 for standing by.

In the Step C927, when the lens communication starts, the camera microcomputer C106 transmits information on driving of the focus lens L105 as the second communication to the lens microcomputer L106. The information on driving of the focus lens L105 contains a command mode set in the Step C925. It also contains a target defocus amount calculated in the Steps C906, C907, C916, and C917, such as the image plane amplitude amount and the image plane center moving amount. It also contains the drive starting timing calculated in the Step C908 or C918 and the reaching prediction timing calculated in the Step C909 or C919. If the current VD is (5) in the example of FIG. 10, this processing corresponds to the transmission timing of the command mode (6) and the target defocus amount (6). In the wobbling, the lens microcomputer L106 sets the driving speed, and thus sets an arbitrary numerical value to the data area (first data area) used to set the driving speed data. In other words, data set to the data area of the driving speed (the driving speed (6)) is not used for the lens unit. The arbitrary numerical value is set to the data area of the driving speed, although it is not used by the lens unit, because the camera microcomputer C106 and the lens microcomputer L106 provide a fixed-length packet communication.

In the Step L905, the lens microcomputer L106 receives information on the driving of the focus lens, such as the command mode and the target defocus amount, transmitted from the camera microcomputer C106 in the Step C927. Thereafter, the lens microcomputer L106 provides driving control of the focus lens based upon the received information, as described later.

After the wobbling processing, the camera microcomputer C106 determines whether the focus lens L105 has reciprocated in the same area a predetermined number of times (NB). When determining that the focus lens L105 has reciprocated in the same area the predetermined number of times (NB), the camera microcomputer C106 calculates an in-focus position based upon the past lens position information and determines the in-focus. Then, the flow moves to the restart determining mode because the in-focus has been determined in the Step 203 in FIG. 2.

When determining that the focus lens L105 has not yet reciprocated in the same area the predetermined number of times (NB), the camera microcomputer C106 determines whether the same in-focus has been detected a predetermined number of times (NB). If the in-focus direction is detected the predetermined number of times (NB), the camera microcomputer C106 determines that the in-focus direction. In this case, the Step 204 moves to the Step 205 in FIG. 2, the in-focus direction is determined, and the flow moves to the mountain-climbing mode.

The control flow of the camera microcomputer C106 and the lens microcomputer L106 in the mountain-climbing in the Step 209 in FIG. 2 is the same as that in the first embodiment (FIGS. 5 and 6). The control flow of driving the focus lens by the lens microcomputer L106 after the Step L905 in FIG. 9B and the Step L505 in FIG. 5 is the same as that of the first embodiment (FIG. 11). The content of the Step 1104 of the above FIG. 11 will be read as follows: Thy comparing the predicted position of the focus lens L105 with the target position set in the Step 1102, the lens microcomputer L106 determines whether the focus lens can reach the target position a predetermined permissible time period after the reaching prediction timing received in the Step L305. It is determined whether the target defocus amount requested by the camera microcomputer C106 can be obtained. The result of the reaching prediction determination is sent from the lens microcomputer L106 to the camera microcomputer C106 in the next Step L303." is replaced with "the lens microcomputer L106 predicts a time period that enables the focus lens to actually reach the target position set in the Step 1102. The result of the predicted reaching time is sent from the lens microcomputer L106 to the camera microcomputer C106 in the next Step L903."

Even in this embodiment, the lens microcomputer L106 switches validity/invalidity of the information set to a specific data area in accordance with the received command mode. More specifically, the lens microcomputer L106 controls driving of the focus lens L105 by using information set to the data area (third data area) of the drive starting timing for the position designating command, and does not use information set to the data area to control driving of the focus lens L105 in the direction designating command. This configuration enables the TVAF control command corresponding to each of wobbling and mountain-climbing to be communicated without changing a communication format in accordance with the command mode.

This embodiment moves the focus lens L105 by repeating the restart determination, wobbling, mountain-climbing, stopping, wobbling and restart determination in the TVAF control in this order. Thereby, an in-focus state can be maintained so that the focus signal can always have a maximum level.

According to this embodiment, the camera body sends information on driving the focus lens L105 to the lens unit, and the lens unit sends information on the position of the focus lens L105 from the lens unit to the camera body. As a result, the camera body can always recognize a cycle of the TVAF control in advance as in the lens integrated type camera even when lens units to be attached to the camera body have different optical characteristics. As a result, the camera body can provide excellent TVAF control.

Thus, each of the above embodiments can provide proper focus control in accordance with an AF operation mode for each of a variety of interchangeable lenses attached to the image-pickup apparatus.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefits of Japanese Patent Application Nos. 2012-127875, and 2012-127886, filed on Jun. 5, 2012 which are hereby incorporated by reference herein in their entirety.

What is claimed is:

1. An image-pickup apparatus to which a lens unit that includes an imaging optical system including a focus lens is attachable, the image-pickup apparatus comprising:
    an image sensor configured to photoelectrically convert an object image formed via the lens unit that has been attached, and to generate an image signal; and
    a controller configured to generate information on driving of the focus lens in the lens unit based upon the image signal and to provide focus control, the controller communicating data with the lens unit in synchronization with a vertical synchronizing signal by a fixed-length packet communication,
    wherein the controller instructs the lens unit on a defocus amount on an image plane corresponding to a driving amount of the focus lens when a command mode is a first mode, and instructs the lens unit on a driving direction and driving speed of the focus lens when the command mode is a second mode different from the first mode, and
    wherein information on the defocus amount on the image plane corresponding to the driving amount of the focus lens is set in a first data area included in data transmitted in the fixed-length packet communication when the command mode is the first mode, and information on the driving direction of the focus lens is set in the first data area when the command mode is the second mode.

2. The image-pickup apparatus according to claim 1, wherein information on the driving speed of the focus lens is set in a second data area included in the data transmitted in the fixed-length packet communication when the command mode is the second mode.

3. The image-pickup apparatus according to claim 1, wherein the controller controls wobbling of the focus lens in an optical axis direction in the first mode, and calculates each of a vibration amplitude amount and a moving amount of a vibration center of the wobbling as the defocus amount on the image plane corresponding to the driving amount of the focus lens.

4. The image-pickup apparatus according to claim 1, wherein the controller sets information on driving timing of the focus lens to a third data area included in the data transmitted in the fixed-length packet communication,
  wherein the information set in the third data area included in the data transmitted in the fixed-length packet communication is used for controlling the driving timing of the focus lens by the lens unit when the command mode is the first mode, and the information set in the third data area is not used for controlling the driving timing of the focus lens by the lens unit when the command mode is the second mode.

5. The image-pickup apparatus according to claim 1, wherein the controller sets information on first timing used to predict a position of the focus lens for each of the first mode and the second mode, and transmits set information to the lens unit.

6. The image-pickup apparatus according to claim 5, wherein the controller sets information on the first timing based upon charge accumulation start timing in the first mode, and sets information on the first timing based upon charge accumulation center timing in the second mode.

7. The image-pickup apparatus according to claim 5, wherein the controller provides focus control using information on a state of the focus lens received from the lens unit in the first mode, and provides focus control without using the information on the state of the focus lens received from the lens unit in the second mode.

8. The image-pickup apparatus according to claim 7, wherein when the command mode is the first mode, the lens unit predicts whether the lens unit can drive the focus lens by the driving amount corresponding to the instructed defocus amount on the image plane by the first timing.

9. The image-pickup apparatus according to claim 8, wherein the information on the state of the focus lens is information indicating whether the lens unit can drive the focus lens by the driving amount corresponding to the instructed defocus amount on the image plane by the first timing.

10. An image-pickup apparatus to which a lens unit that includes an imaging optical system including a focus lens is attachable, the image-pickup apparatus comprising:
  an image sensor configured to photoelectrically convert an object image formed via the lens unit that has been attached, and to generate an image signal; and
  a controller configured to generate information on driving of the focus lens in the lens unit based upon the image signal and to provide focus control, the controller communicating data with the lens unit in synchronization with a vertical synchronizing signal by a fixed-length packet communication,
  wherein the controller instructs the lens unit on a defocus amount on an image plane corresponding to a driving amount of the focus lens when a command mode is a first mode, and instructs the lens unit on a driving direction and driving speed of the focus lens when the command mode is a second mode different from the first mode, and
  wherein the controller sets information on first timing used to predict a position of the focus lens for each of the first mode and the second mode, and transmits set information to the lens unit.

11. The image-pickup apparatus according to claim 10, wherein the controller sets information on the first timing based upon charge accumulation start timing in the first mode, and sets information on the first timing based upon charge accumulation center timing in the second mode.

12. The image-pickup apparatus according to claim 10, wherein the controller provides focus control using information on a state of the focus lens received from the lens unit in the first mode, and provides focus control without using the information on the state of the focus lens received from the lens unit in the second mode.

13. The image-pickup apparatus according to claim 12, wherein when the command mode is the first mode, the lens unit predicts whether the lens unit can drive the focus lens by the driving amount corresponding to the instructed defocus amount on the image plane by the first timing.

14. The image-pickup apparatus according to claim 13, wherein, the information on the state of the focus lens is information indicating whether the lens unit can drive the focus lens by the driving amount corresponding to the instructed defocus amount on the image plane by the first timing.

15. A lens unit attachable to an image-pickup apparatus, the lens unit comprising:
  an imaging optical system including a focus lens;
  a driver configured to drive the focus lens; and
  a lens controller configured to communicate data with the image-pickup apparatus to which the lens unit is attached in synchronization with a vertical synchronizing signal by a fixed-length packet communication, and to control the driver based upon information on driving of the focus lens received from the image-pickup apparatus,
  wherein the lens controller controls the driver based upon a defocus amount on an image plane corresponding to a driving amount of the focus lens instructed by the image-pickup apparatus when a command mode is a first mode, and controls the driver based upon a driving direction and driving speed of the focus lens instructed by the image-pickup apparatus when the command mode is a second mode different from the first mode, and
  wherein information on the defocus amount on the image plane corresponding to the driving amount of the focus lens is set in a first data area included in data received in the fixed-length packet communication when the command mode is the first mode, and information on the driving direction of the focus lens is set in the first data area when the command mode is the second mode.

16. The lens unit according to claim 15, wherein information on the driving speed of the focus lens is set in a second data area included in the data received in the fixed-length packet communication when the command mode is the second mode.

17. The lens unit according to claim 15, wherein the lens controller calculates an actual driving amount of the focus lens based upon the information set in the first data area when the command mode is the first mode.

18. The lens unit according to claim 15, wherein wobbling of the focus lens in an optical axis direction is controlled in the first mode, and each of a vibration amplitude amount and a moving amount of a vibration center of the wobbling is instructed by the image-pickup apparatus as the defocus amount on the image plane corresponding to the driving amount of the focus lens.

19. The lens unit according to claim 15, wherein the lens controller controls the driver using information on driving timing of the focus lens set in a third data area included in the data received in the fixed-length packet communication when the command mode is the first mode, and the lens controlled controls the driver without using the information set in the third data area when the command mode is the second mode.

20. The lens unit according to claim 15, wherein the lens controller receives information on first timing by the image-pickup apparatus, and predicts a position of the focus lens at the first timing indicated by the received information.

21. The lens unit according to claim 20, wherein when the command mode is the first mode, the lens controller transmits information indicating whether the lens unit can drive the focus lens by the driving amount corresponding to the instructed defocus amount on the image plane by the first timing.

22. A lens unit attachable to an image-pickup apparatus, the lens unit comprising:
an imaging optical system including a focus lens;
a driver configured to drive the focus lens; and
a lens controller configured to communicate data with the image-pickup apparatus to which the lens unit is attached in synchronization with a vertical synchronizing signal by a fixed-length packet communication, and to control the driver based upon information on driving of the focus lens received from the image-pickup apparatus,
wherein the lens controller controls the driver based upon a defocus amount on an image plane corresponding to a driving amount of the focus lens instructed by the image-pickup apparatus when a command mode is a first mode, and controls the driver based upon a driving direction and driving speed of the focus lens instructed by the image-pickup apparatus when the command mode is a second mode different from the first mode, and
wherein the lens controller receives information on first timing from the image-pickup apparatus, and predicts a position of the focus lens at the first timing indicated by the received information.

23. The lens unit according to claim 22, wherein, when the command mode is the first mode, the lens controller transmits information indicating whether the lens unit can drive the focus lens by the driving amount corresponding to the instructed defocus amount on the image plane by the first timing.

24. A control method of an image-pickup apparatus to which a lens unit that includes an imaging optical system including a focus lens is attachable, the image-pickup apparatus including an image sensor configured to photoelectrically convert an object image formed via the lens unit attached to the image-pickup apparatus and to generate an image signal, the control method comprising the steps of:
generating information on driving of the focus lens in the lens unit based upon the image signal and providing focus control, and
communicating data with the lens unit in synchronization with a vertical synchronizing signal by a fixed-length packet communication,
wherein a defocus amount on an image plane corresponding to a driving amount of the focus lens is instructed when a command mode is a first mode, and a driving direction and driving speed of the focus lens are instructed when the command mode is a second mode different from the first mode, and
wherein information on the defocus amount on the image plane corresponding to the driving amount of the focus lens is set in a first data area included in data transmitted in the fixed-length packet communication when the command mode is the first mode, and information on the driving direction of the focus lens is set in the first data area when the command mode is the second mode.

25. A control method of an image-pickup apparatus to which a lens unit that includes an imaging optical system including a focus lens is attachable, the image-pickup apparatus including an image sensor configured to photoelectrically convert an object image formed via the lens unit attached to the image-pickup apparatus and to generate an image signal, the control method comprising the steps of:
generating information on driving of the focus lens in the lens unit based upon the image signal and providing focus control, and
communicating data with the lens unit in synchronization with a vertical synchronizing signal by a fixed-length packet communication,
wherein a defocus amount on an image plane corresponding to a driving amount of the focus lens is instructed when a command mode is a first mode, and a driving direction and driving speed of the focus lens are instructed when the command mode is a second mode different from the first mode, and
wherein information on first timing used to predict a position of the focus lens is set for each of the first mode and the second mode and transmitted to the lens unit.

26. A control method of a lens unit attachable to an image-pickup apparatus, the lens unit including an imaging optical system that includes a focus lens, and a driver configured to drive the focus lens, the control method comprising the steps of:
communicating data with the image-pickup apparatus to which the lens unit is attached in synchronization with a vertical synchronizing signal by a fixed-length packet communication, and
controlling the driver based upon information on driving of the focus lens received from the image-pickup apparatus,
wherein the controlling step controls the driver based upon a defocus amount on an image plane corresponding to a driving amount of the focus lens instructed by the image-pickup apparatus when a command mode is a first mode, and controls the driver based upon a driving direction and driving speed of the focus lens instructed by the image-pickup apparatus when the command mode is a second mode different from the first mode, and
wherein information on the defocus amount on the image plane corresponding to the driving amount of the focus lens is set in a first data area included in data received in the fixed-length packet communication when the command mode is the first mode, and information on the driving direction of the focus lens is set in the first data area when the command mode is the second mode.

27. A control method of a lens unit attachable to an image-pickup apparatus, the lens unit including an imaging optical system that includes a focus lens, and a driver configured to drive the focus lens, the control method comprising the steps of:
communicating data with the image-pickup apparatus to which the lens unit is attached in synchronization with a vertical synchronizing signal by a fixed-length packet communication, and
controlling the driver based upon information on driving of the focus lens received from the image-pickup apparatus,
wherein the controlling step controls the driver based upon a defocus amount on an image plane corresponding to a driving amount of the focus lens instructed by the image-pickup apparatus when a command mode is a first mode, and controls the driver based upon a driving direction and driving speed of the focus lens instructed by the image-pickup apparatus when the command mode is a second mode different from the first mode, and
wherein information on first timing is received from the image-pickup apparatus, and the controlling step predicts a position of the focus lens at the first timing indicated by the received information.

* * * * *